(12) United States Patent
Fujita et al.

(10) Patent No.: US 12,172,389 B2
(45) Date of Patent: *Dec. 24, 2024

(54) MOLDING APPARATUS, MANUFACTURING METHOD, AND FIBER REINFORCED RESIN MATERIAL

(71) Applicant: ADEKA CORPORATION, Tokyo (JP)

(72) Inventors: Naohiro Fujita, Saitama (JP); Kazuhide Morino, Saitama (JP); Masato Inadome, Saitama (JP); Masayoshi Goke, Shizuoka (JP); Takeshi Sukemune, Shizuoka (JP); Yosuke Aragane, Shizuoka (JP); Tomo Kimura, Shizuoka (JP); Akinori Okubo, Shizuoka (JP)

(73) Assignee: ADEKA CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/777,032

(22) PCT Filed: Nov. 21, 2016

(86) PCT No.: PCT/JP2016/084415
§ 371 (c)(1),
(2) Date: May 17, 2018

(87) PCT Pub. No.: WO2017/090551
PCT Pub. Date: Jun. 1, 2017

(65) Prior Publication Data
US 2018/0361685 A1 Dec. 20, 2018

(30) Foreign Application Priority Data
Nov. 25, 2015 (JP) ................. 2015-229455

(51) Int. Cl.
B29C 70/34 (2006.01)
B29C 70/06 (2006.01)
(Continued)

(52) U.S. Cl.
CPC .............. *B29C 70/34* (2013.01); *B29C 70/06* (2013.01); *B29C 70/382* (2013.01); *B29C 70/56* (2013.01);
(Continued)

(58) Field of Classification Search
CPC ... B29C 70/382; B29C 70/504; B29C 70/508; B29C 70/541
(Continued)

(56) References Cited

U.S. PATENT DOCUMENTS 3,689,343 A * 9/1972 Elsner .................. B29C 70/28
156/179
5,196,457 A 3/1993 Wilkinson et al.
(Continued)

FOREIGN PATENT DOCUMENTS

CN 1578799 A 2/2005
CN 101462358 A 6/2009
(Continued)

OTHER PUBLICATIONS

English Translation of WO 2015152331 (Year: 2015).*
(Continued)

*Primary Examiner* — Michael A Tolin
*Assistant Examiner* — Hana C Page
(74) *Attorney, Agent, or Firm* — Norris McLaughlin, PA

(57) ABSTRACT

A molding apparatus reduces waviness or deformation of fibers. The molding apparatus includes a fiber feeder (7) that feeds fibers (5) to a lamination area (32) long in a first direction, a resin composition feeder (11) that feeds a resin composition (9) to the lamination area (32), an impregnator
(Continued)

(17) that impregnates the fibers (5) fed to the lamination area (32) with the resin composition (9), a curing accelerator (13) that accelerates curing of the resin composition (9) fed to the lamination area (32) while the fibers (5) fed in the lamination area (32) are being tensioned, and a transporter (15) that relatively moves the devices (7, 11, 17, and 13) in the first direction with respect to the lamination area (32). The resin composition (9) contains an epoxy resin (A), a cyanate resin (B), and an aromatic amine curing agent (C) that is liquid at 25° C.

17 Claims, 15 Drawing Sheets

(51) Int. Cl.
  *B29C 70/38* (2006.01)
  *B29C 70/56* (2006.01)
  *C08J 5/04* (2006.01)
  *B29K 63/00* (2006.01)
  *B29K 105/00* (2006.01)

(52) U.S. Cl.
  CPC ............ *C08J 5/04* (2013.01); *B29K 2063/00* (2013.01); *B29K 2105/0005* (2013.01)

(58) Field of Classification Search
  USPC ........................................................ 156/242
  See application file for complete search history.

(56) References Cited

U.S. PATENT DOCUMENTS

| | | | | |
|---|---|---|---|---|
| 5,665,451 | A * | 9/1997 | Dorn | B29C 70/222 |
| | | | | 428/116 |
| 8,336,596 | B2 * | 12/2012 | Nelson | B29C 70/207 |
| | | | | 156/523 |
| 8,580,060 | B2 * | 11/2013 | Bech | B29C 70/20 |
| | | | | 156/169 |
| 9,597,842 | B2 * | 3/2017 | Borgmann | B29C 70/386 |
| 10,016,947 | B2 * | 7/2018 | Matsen | B29C 65/32 |
| 2004/0247882 | A1 | 12/2004 | Kouchi et al. | |
| 2009/0151865 | A1 * | 6/2009 | Martinez | B29C 70/386 |
| | | | | 156/538 |
| 2009/0211698 | A1 | 8/2009 | McCowin | |
| 2011/0000608 | A1 | 1/2011 | Bech | |
| 2011/0240218 | A1 | 10/2011 | Nelson et al. | |
| 2012/0298309 | A1 | 11/2012 | Arakawa et al. | |
| 2014/0061974 | A1 | 3/2014 | Tyler | |
| 2014/0342028 | A1 | 11/2014 | Kwon et al. | |
| 2016/0304684 | A1 * | 10/2016 | Ellinger | C08J 5/24 |

FOREIGN PATENT DOCUMENTS

| | | | | |
|---|---|---|---|---|
| CN | 102153724 A | 8/2011 | | |
| CN | 102 276 961 A | 12/2011 | | |
| EP | 0421588 A2 | 1/1991 | | |
| EP | 2540480 A1 * | 1/2013 | ........... B29C 70/545 |
| GB | 2213793 A * | 8/1989 | ............ B29C 35/10 |
| JP | 2002-292666 A | 10/2002 | | |
| JP | 2003-42056 A | 2/2003 | | |
| JP | 2009-28961 A | 2/2009 | | |
| JP | 2010180352 A | 8/2010 | | |
| WO | 2015/152331 A1 | 10/2015 | | |

OTHER PUBLICATIONS

Translation of Search Report dated Aug. 1, 2019, in connection with European Patent Application No. 16868498.3.

International Search Report dated Dec. 15, 2016, mailed Dec. 27, 2016.

English Translation of International Search Report dated Dec. 15, 2016, mailed Dec. 27, 2016.

* cited by examiner

MOLDING APPARATUS, MANUFACTURING METHOD, AND FIBER REINFORCED RESIN MATERIAL

This application is a 371 of PCT/JP2016/084415, filed Nov. 21, 2016, which claims foreign priority benefit under 35 U.S.C. § 119 of the Japanese Patent Application No. 2015-229455 filed Nov. 25, 2015, the disclosures of which are incorporated herein by reference.

TECHNICAL FIELD

The present invention relates to a molding apparatus for molding a fiber reinforced resin material into a molded item, particularly a large molded item, and a method for manufacturing the molded item.

BACKGROUND ART

Large molded items range from large wind turbine blades, airplane wings, and to airplane bodies. Such molded items are manufactured through, for example, a preform process of laminating reinforcing fibers in a mold, a pressurizing process of pressurizing the preform by, for example, decompressing the inside of a bag containing the preform, a resin injection process of injecting a resin into the decompressed bag (preform), and a curing process of curing the injected resin (refer to, for example, Patent Literature 1).

CITATION LIST

Patent Literature

Patent Literature 1: Japanese Unexamined Patent Application Publication No. 2003-42056

SUMMARY OF INVENTION

Technical Problems

The above technique uses textile-form reinforcing fibers that have less fiber waviness or fiber deformation. However, reinforcing fibers (dry fibers) (a fiber bundle or a fiber tow) can easily have waviness or deformation when oriented unidirectionally. Fibers with more waviness or deformation can have lower mechanical properties. Increasing the thickness of a molded item to compensate for such lower mechanical properties can increase the cost or the weight of the molded item.

In response to the above issue, one or more aspects of the present invention are directed to a molding apparatus and a manufacturing method that reduce waviness or deformation of unidirectionally oriented reinforcing fibers.

Solution to Problems

One aspect of the present invention provides a molding apparatus including a fiber feeder that feeds fibers to a lamination area long in a first direction, a resin composition feeder that feeds a resin composition to the lamination area, an impregnator that impregnates the fibers fed to the lamination area with the resin composition, a curing accelerator that accelerates curing of the resin composition fed to the lamination area while the fibers fed in the lamination area are being tensioned, and a transporter that relatively moves the fiber feeder, the resin composition feeder, the impregnator, and the curing accelerator in the first direction with respect to the lamination area. The resin composition contains an epoxy resin (A), a cyanate resin (B), and an aromatic amine curing agent (C) that is liquid at 25° C.

Another aspect of the present invention provides a method for manufacturing a fiber reinforced resin material that is long in a first direction by feeding fibers and a resin composition to a lamination area supported in a manner relatively movable in the first direction and long in the first direction. The method includes feeding fibers to a first end in the first direction of the lamination area, feeding a resin composition to the first end of the lamination area, accelerating curing of the resin composition fed to the first end of the lamination area, relatively moving the lamination area to have the first end of the lamination area as a front end in a movement direction after accelerating curing of the resin composition, feeding the fibers to the lamination area while the area is moving relatively, feeding the resin composition to the lamination area while the area is moving relatively, and accelerating curing of the resin composition fed to a second end in the first direction of the lamination area. The resin composition contains an epoxy resin (A), a cyanate resin (B), and an aromatic amine curing agent (C) that is liquid at 25° C.

Another aspect of the present invention provides a method for manufacturing a fiber reinforced resin material that is long in a first direction by feeding fibers and a resin composition to a lamination area supported in a manner relatively movable in the first direction and long in the first direction. The method includes accelerating curing of the resin composition included in the fibers and the resin composition fed to a first end in the first direction of the lamination area, feeding the fibers being tensioned, and the resin composition to the lamination area while relatively moving the lamination area to have the first end of the lamination area as a front end in a movement direction after accelerating curing of the resin composition, and accelerating curing of the resin composition included in the fibers and the resin composition fed to a second end in the first direction of the lamination area. The resin composition contains an epoxy resin (A), a cyanate resin (B), and an aromatic amine curing agent (C) that is liquid at 25° C.

The fiber reinforced resin material according to one or more aspects of the present invention is obtainable using the manufacturing method according to the above aspects of the present invention.

Advantageous Effects of Invention

The aspects of the present invention accelerate curing of a resin composition that is fed to a lamination area while fibers are being tensioned. The resultant fibers have less waviness or deformation.

DESCRIPTION OF EMBODIMENTS

Overview

Figure 1A:
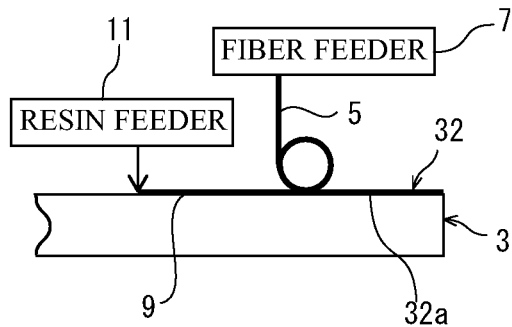
FIGS. 1A to 1D are schematic diagrams of a molding apparatus.

As shown in FIGS. 1A to 1D, a molding apparatus 1 includes a fiber feeder 7, which feeds fibers 5 (a fiber bundle or a fiber tow) to a lamination area 32 long in a first direction, a resin composition feeder (hereafter, a resin feeder) 11, which feeds a resin composition 9 to the lamination area 32, an impregnator (for example, a pressing device 17), which impregnates fibers 5 fed in the lamination area 32 with the resin composition 9, a curing accelerator 13, which accelerates curing of the resin composition 9 fed to the lamination area 32 while the fibers 5 fed in the lamination area 32 are being tensioned, and a transporter 15, which relatively moves the fiber feeder 7, the resin feeder 11, the impregnator (17), and the curing accelerator 13 in the first direction in the lamination area 32. In the example shown in FIGS. 1A to 1D, a mold 3, which is long in the first direction, has the lamination area 32.

Impregnating the fibers with the resin composition herein refers to causing fibers (filaments) to have the resin composition entering (present) between them. Any method (means) may be used for such entry (presence). Although any amount of resin may enter between fibers, a molded item will have better mechanical properties when less voids form between the fibers (filaments).

The fiber feeder 7 feeds the fibers 5 to a first end 32a of the lamination area 32 while the fibers 5 are being tensioned. The resin feeder 11 feeds the resin composition 9 to the first end 32a of the lamination area 32. The transporter 15 causes movement from the first end 32a toward a second end 32b of the lamination area 32. More specifically, the transporter 15 moves the mold 3 in the first direction to have the first end 32a of the lamination area 32 as its front end in the movement direction. In the example of FIGS. 1A to 1D, the fiber feeder 7, the resin feeder 11, the impregnator (17), and the curing accelerator 13 are fixed, whereas the mold 3 moves.

The curing accelerator 13 accelerates curing of the resin composition 9 fed to the first end 32a of the lamination area 32 until the fibers 5, which are fed to the first end 32a of the lamination area 32 as the transporter 15 relatively moves the fiber feeder 7, become unremovable from the resin composition 9 fed to the first end 32a of the lamination area 32. This causes the fibers 5 to have less waviness or deformation.

The fiber feeder 7 feeds the fibers 5 to the lamination area 32, which includes the fed resin composition 9. This enhances impregnation of the fibers with the resin.

In other words, the molding apparatus 1 includes the mold 3, which has the lamination area 32 supported in a manner relatively movable in the first direction (the horizontal direction in the figure) and long in the first direction, the fiber feeder 7, which feeds the fibers 5 to the first end 32a of the lamination area 32 in the first direction and to the lamination area 32 that is moving relatively, the resin feeder 11, which feeds the resin composition 9 to the first end 32a of the lamination area 32 and to the lamination area 32 that is moving relatively, the curing accelerator 13, which accelerates curing of at least the resin composition 9 fed to the first end 32a of the lamination area 32 and then the resin composition 9 fed to the second end 32b of the lamination area 32 in the first direction, and the transporter 15, which relatively moves the mold 3 to have the first end 32a of the lamination area 32 as its front end in the movement direction while the fed fibers 5 are being tensioned after curing of the resin composition 9 fed to the first end 32a of the lamination area 32 has been accelerated.

Figure 1B:
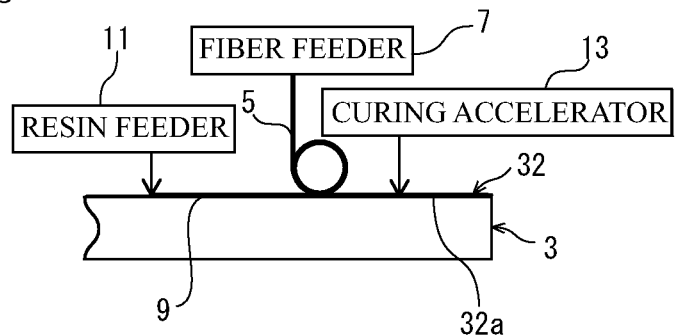
Figure 1C:
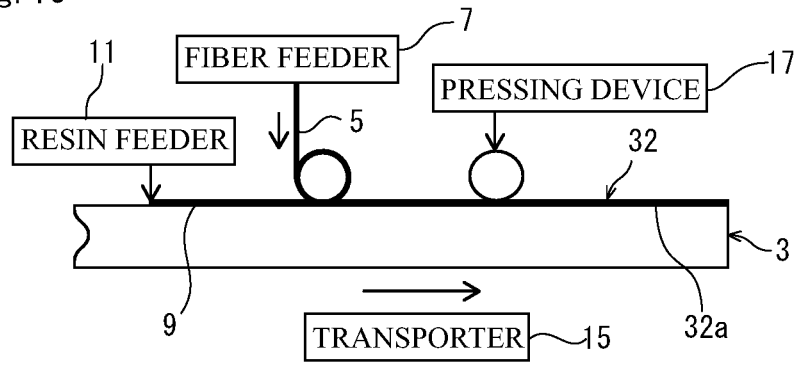
Figure 1D:
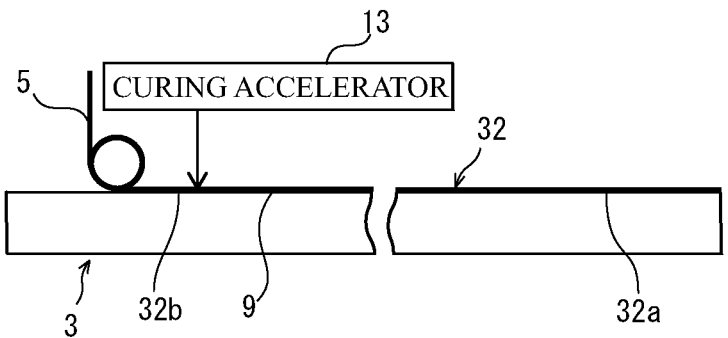

The molding apparatus 1 includes the resin feeder 11 and the fiber feeder 7, which first feed the resin composition 9 and the fibers 5 to the front end portion 32a (first end) of the lamination area 32 as shown in FIG. 1A, and further includes the curing accelerator 13, which then accelerates curing of the resin composition 9 in the front end portion 32a of the lamination area 32 as shown in FIG. 1B. As shown in FIG. 1C, the molding apparatus 1 further includes the transporter 15, which then moves the mold 3 to have the front end portion 32a of the lamination area 32 as its front end in the movement direction, while the resin composition 9 and the fibers 5 are continuously being fed. When the resin composition 9 and the fibers 5 are fed to a rear end portion 32b (second end) of the lamination area 32, as shown in FIG. 1D, the curing accelerator 13 in the molding apparatus 1 accelerates curing of the resin composition 9 in the rear end portion 32b of the lamination area 32.

As shown in FIG. 1C, the molding apparatus 1 may include the pressing device 17 for pressing the fed fibers 5 against the mold 3 downstream from the resin feeder 11 and the fiber feeder 7.

The molding apparatus may further include a curing device. When using a separate device that cures the laminate of the resin composition 9 and the fibers 5, the above molding apparatus may also serve as a lamination apparatus.

The molding apparatus 1 described above uses a method for manufacturing a molded item formed from a fiber reinforced resin material that is long in the first direction by feeding the fibers and the resin to the lamination area 32 supported in a manner relatively movable in the first direction and long in the first direction. More specifically, the manufacturing method includes accelerating curing of the resin composition 9 included in the fibers 5 and the resin composition 9 fed to the first end 32a in the first direction of the lamination area 32, then feeding the tensioned fibers 5 and the resin composition 9 to the lamination area 32 while relatively moving the lamination area 32 to have its first end 32a as its front end in the movement direction, and accelerating curing of the resin composition 9 included in the fibers 5 and the resin composition 9 fed to the second end 32b of the lamination area 32 in the first direction.

In other words, the method for manufacturing a fiber reinforced resin material that is long in a first direction by feeding fibers 5 and a resin composition 9 to a lamination area 32 supported in a manner relatively movable in the first direction and long in the first direction includes feeding the fibers 5 to a first end 32a in the first direction of the lamination area 32, feeding the resin composition 9 to the first end 32a of the lamination area 32, accelerating curing of the resin composition 9 fed to the first end 32a of the lamination area 32, relatively moving the lamination area 32 to have the first end 32a of the lamination area 32 as a front end in a movement direction after accelerating curing of the resin composition 9, feeding the fibers 5 to the lamination area 32 while the area is moving relatively, feeding the resin composition 9 to the lamination area 32 while the area is moving relatively, and accelerating curing of the resin composition 9 fed to a second end 32b in the first direction of the lamination area 32.

Relatively moving herein includes moving the mold 3, and moving the fiber feeder 7, the resin feeder 11, the curing accelerator 13, and the pressing device 17 while the mold 3 is being fixed.

The first direction herein refers to the longitudinal direction of a long fiber reinforced resin material (a molded item). The fibers 5 herein refer to continuous fibers without a resin matrix adhering to the fibers to form a fiber reinforced resin material. The fibers 5 may be the same fibers or different types of fibers. Examples of such fibers include carbon fibers, glass fibers, aramid fibers, boron fibers, and metal fibers.

The resin composition 9 may be applied, ejected, or may be provided in a film when being fed.

The fibers 5 may be fed before or after the resin composition 9 is fed.

Accelerating curing of the resin composition herein refers to applying energy (thermal energy or activation energy) to the resin composition to accelerate its curing, and does not include acceleration of resin composition curing in natural environments. In other words, accelerating curing of the resin composition refers to accelerating curing of the resin composition at a rate faster than in natural environments.

After accelerating curing of the resin composition 9 fed to the first end 32a of the lamination area 32 herein refers to after accelerating curing of the resin composition 9 until the fibers 5 are unremovable from the resin composition 9 due to the tension applied on the fibers 5 when the mold 3 is relatively moved. This may be before the resin composition 9 is cured completely or after the resin composition 9 is cured completely.

The curing accelerator 13 accelerates curing of the resin composition 9 until the fibers 5 become unremovable from the resin composition 9 due to the tension, which is fed to the first end 32a and has undergone accelerated curing. This allows the fibers 5 to remain tensioned when, for example, the mold 3 is moved relatively.

The molding apparatus 1 may include the pressing device 17, which applies a pressure to the fed fibers 5 and the resin composition 9 while the fed fibers 5 remain tensioned. This facilitates impregnation of the fibers 5 with the resin composition 9.

The fiber feeder 7 may feed the fibers 5 to the lamination area 32 to which the resin composition 9 has been fed. This facilitates impregnation of the fibers 5 with the resin composition 9. In this case, the fiber feeder 7 feeds the fibers 5 to the surface of the resin composition 9 (surface opposite to the mold 3) fed to the lamination area 32.

The resin composition used in the present embodiment will now be described.

The resin composition used in the present invention contains an epoxy resin (A), a cyanate resin (B), and an aromatic amine curing agent (C) that is liquid at 25° C.

The resin composition used in the present embodiment has high heat resistance, as well as large elongation and high elasticity when cured, and thus tightly adheres to fibers. A fiber reinforced resin material (fiber reinforced plastic) using this resin composition can easily have high heat resistance and high strength.

The epoxy resin (A) used in the present embodiment may contain at least 20% by mass of an epoxy compound represented by general formula (1) below:

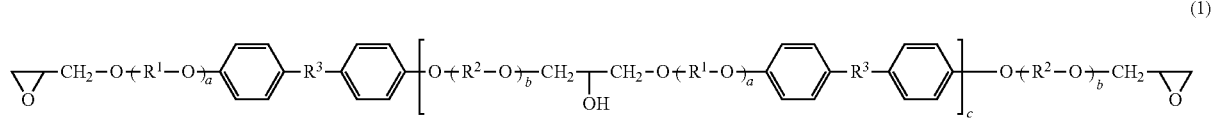

(1)

where a and b are each independently an integer of 2 to 10, c is an integer of 0 to 3, $R^1$ and $R^2$ are each independently a divalent hydrocarbon group having 2 to 5 carbon atoms, and $R^3$ is a single bond, a methylene group, or —$C(CH_3)_2$—.

The epoxy resin (A) may contain 20 to 100% by mass of the compound represented by formula (1). To further enhance the tensile stress of the cured product, the amount of the compound represented by formula (1) may specifically be 30 to 80% by mass, and more specifically be 40 to 60% by mass. Although not adversely affecting the strength of the cured product, an epoxy resin (A) containing less than 20% by mass of the compound does not increase the elongation, and thus may lower the toughness of the cured product.

The cured product obtainable by reacting the compound represented by formula (1) or the epoxy resin containing the compound represented by formula (1) with, for example, a curing agent has larger elongation and higher flexibility than a cured product obtainable by curing simply a bisphenol epoxy resin. Thus, the cured product containing the compound represented by formula (1) used together with fiber materials can stretch together with the fibers. The resultant fiber reinforced plastic can have high strength.

When the resin composition is used together with fiber materials, the epoxy resin (A) may contain 40 to 95% by mass, or specifically 60 to 90% by mass of the compound represented by formula (1) to allow the resin composition to stretch together with the fiber materials. When the epoxy resin (A) contains less than 20% by mass of the compound, the cured product cannot stretch together with the fiber materials and peels off the fiber materials. This can greatly lower the tensile strength of the obtainable fiber reinforced plastic.

The subscripts a and b in formula (1) are each independently an integer of 2 to 10. The averages of a and b may each independently be 3 to 7, and specifically 4 to 6, to have an intended crosslink density of the cured product. When the averages of a and b are each independently less than 2, the cured product can have an excessively high crosslink density to lower the flexibility greatly. When the averages of a and b are each greater than 10, the cured product can have a lower crosslink density, greatly lowering the strength.

The subscript c in formula (1) is an integer of 0 to 3. The average of c may be 0 to 2, and may specifically be 0 to 1 to provide intended workability. When the average of c is greater than 3, the resin can have an increased viscosity to lower the workability.

In formula (1), $R^1$ and $R^2$ may be each independently a divalent hydrocarbon group having 2 to 4 carbon atoms, and specifically a propylene group, which is widely available.

The compound represented by formula (1) used in the present embodiment may be manufactured by any method. For example, a compound having two phenolic hydroxyl groups (hydroxyl groups directly bonding to aromatic rings), such as bisphenol A, bisphenol F, and biphenol, is used. At least two equivalents of alkylene oxide are added to one equivalent of the phenolic hydroxyl group contained in the compound having two phenolic hydroxyl groups using a catalyst as appropriate. The resultant alkylene oxide adduct is then reacted with epichlorohydrin using a catalyst and/or a solvent as appropriate. This yields the compound represented by formula (1).

Examples of the above alkylene oxide include ethylene oxide, 1,2-propylene oxide, 1,2-butylene oxide, and 1,2-pentylene oxide. When 1,2-propylene oxide is used, $R^1$ and $R^2$ in formula (1) are propylene groups.

For example, when two equivalents of alkylene oxide are used per equivalent of the phenolic hydroxyl group, the averages of a and b in formula (1) are each 2 theoretically.

The catalyst used to add the alkylene oxide may be an acid catalyst or an alkali catalyst. Examples of the acid catalyst include Brønsted acids such as sulfuric acid and phosphoric acid, and Lewis acids such as stannic chloride and boron trifluoride. Examples of the alkali catalyst include tertiary amine, and hydroxides of an alkali metal, an alkali earth metal, and quaternary ammonium, such as sodium hydroxide, potassium hydroxide, ammonium hydroxide, calcium hydroxide, and barium hydroxide. Examples of the alkali catalyst also include alkali metal carbonates, such as potassium carbonate and sodium carbonate. To simply and easily perform the refining process following the reaction, the catalyst(s) used in the present embodiment may be an alkali catalyst, specifically an alkali metal hydroxide or an alkali earth metal hydroxide, and more specifically an alkali metal hydroxide. These catalysts may be used alone or in combination.

Examples of the catalyst used to react epichlorohydrin include, in addition to the catalysts for adding alkylene oxide, phase transfer catalysts such as tetrabutylammonium salt, trioctylmethylammonium salt, and benzyldimethyloctadecylammonium salt. To allow the reaction to be followed by simple and easy refining, the catalyst(s) to be used in the present embodiment may be an alkali catalyst, specifically an alkali metal hydroxide or an alkali earth metal hydroxide, and more specifically an alkali metal hydroxide. These catalysts may be used alone or in combination.

Examples of the solvent used to react epichlorohydrin include ketone solvents such as acetone and methyl ethyl ketone, alcohol solvents such as methanol, ethanol, 1-propyl alcohol, isopropyl alcohol, 1-butanol, 2-butanol, and tert-butanol, cellosolve (trademark) solvents such as methyl cellosolve and ethyl cellosolve, ether solvents such as tetrahydrofuran, 1,4-dioxane, 1,3-dioxane, and diethoxyethane, and aprotic polar solvents such as acetonitrile, dimethyl sulfoxide, and dimethyl formamide. These organic solvents may be used alone or in combination.

The amount of epichlorohydrin used to react epichlorohydrin with the alkylene oxide adduct is 1 to 10 equivalents per equivalent of the hydroxyl group contained in the alkylene oxide adduct. The reaction is followed by distillation of extra epichlorohydrin to yield the epoxy compound represented by formula (1). As the amount of epichlorohydrin used increases toward 10 equivalents, the average of c in formula (1) tends to approach 0. As the amount of epichlorohydrin used decreases toward one equivalent, the average of c in formula (1) tends to increase toward 3.

In the present embodiment, the epoxy resin (A) may also contain other epoxy compounds as appropriate, in addition to the epoxy compound represented by formula (1). Such other epoxy compounds may have any molecular structures and molecular weights. Any known epoxy resin that has at least two epoxy groups in its molecules may be selected as appropriate. In the present embodiment, a resin composition that is liquid at 25° C. may be used for easily impregnating the fiber materials.

Examples of the other epoxy compounds include bisphenol epoxy resins, such as bisphenol A epoxy resin and bisphenol F epoxy resin; biphenyl epoxy resins, such as biphenyl epoxy resin and tetramethylbiphenyl epoxy resin; dicyclopentadiene epoxy resin; naphthalene epoxy resin; cycloaliphatic epoxy resins obtained from, for example, cyclohexanedimethanol or hydrogenated bisphenol A; epoxy compounds having glycidyl amino groups, such as N,N-diglycidylaniline, bis(4-(N-methyl-N-glycidylamino)phenyl)methane, diglycidyl-o-toluidine; epoxides of cyclic olefin compounds, such as vinylcyclohexene diepoxide, 3,4-epoxycyclohexylmethyl-3,4-epoxycyclohexane carboxylate, 3,4-epoxy-6-methylcyclohexylmethyl-6-methylcyclohexanecarboxylate, bis(3,4-epoxy-6-methylcyclohexylmethyl)adipate; and heterocyclic compounds, such as triglycidyl isocyanurate and epoxidized conjugated diene polymers including epoxidized polybutadiene and epoxidized styrene-butadiene copolymer.

Among these materials, the resin composition according to the present embodiment may contain bisphenol A epoxy resin and/or bisphenol F epoxy resin, which are inexpensive.

When the resin composition is used together with fibers materials, dicyclopentadiene epoxy resin may be used to improve adhesion of the cured product to the fibers. In this case, the epoxy resin (A) may contain 0.1 to 30%, or specifically 3 to 15% by mass of the dicyclopentadiene epoxy resin.

The epoxy resin (A) used in the present embodiment may contain 70 to 3000 equivalents of epoxy, or specifically 100 to 2000 equivalents of epoxy. Resins containing less than 70 equivalents of epoxy are rarely available and thus cannot be used. Resins containing more than 3000 equivalents of epoxy can reduce the crosslink density of the resultant resin composition, thus greatly degrading the physical properties.

The resin composition according to the present embodiment may also contain a reactive diluent to adjust its viscosity as appropriate for use. Such a reactive diluent may have at least one epoxy group to prevent the epoxy resin composition according to the present embodiment from having a lower heat resistance or a lower glass-transition temperature when cured.

Examples of the reactive diluent having one epoxy group include n-butyl glycidyl ether, alkyl ($C_{12}$ to $C_{14}$) glycidyl ether, allyl glycidyl ether, 2-ethylhexyl glycidyl ether, styrene oxide, phenyl glycidyl ether, cresyl glycidyl ether, p-sec-butylphenyl glycidyl ether, t-butylphenyl glycidyl ether, glycidyl methacrylate, and glycidyl ester of tertiary carboxylic acid.

Examples of the reactive diluent having two epoxy groups include ethylene glycol diglycidyl ether, propylene glycol diglycidyl ether, butanediol diglycidyl ether, 1,6-hexanediol diglycidyl ether, and neopentyl glycol diglycidyl ether.

Examples of the reactive diluent having three epoxy groups include trimethylolpropane triglycidyl ether and glycerol triglycidyl ether.

The cyanate resin (B) used in the present embodiment may have any molecular structure and molecular weight. Any cyanate resin may be selected as appropriate from known cyanate resins. The resin composition according to the present embodiment may contain a cyanate resin having at least two cyanate groups (OCN group) in its molecules. Examples of the cyanate resin include the compounds represented by general formulas (2-1) and (2-2) and prepolymers of the compounds.

(2-1)

In formula (2-1), $R^a$ is a divalent hydrocarbon group, $R^b$ and $R^c$ are each independently an unsubstituted phenylene group or a phenylene group substituted with 1 to 4 alkyl groups.

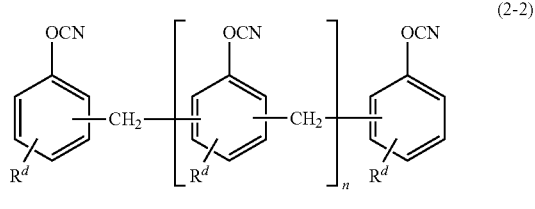

(2-2)

In formula (2-2), n is an integer of 1 to 10, and $R^d$ is a hydrogen atom or an alkyl group having 1 to 4 carbon atoms.

Among the above components, the compound represented by general formula (2-1) may be used to provide intended workability, and the compound represented by general formula (2-3) below may further be used.

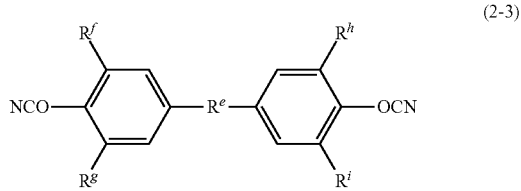

(2-3)

In formula (2-3), $R^e$ is a single bond, a methylene group, —CH(CH$_3$)—, —C(CH$_3$)$_2$—, or any one of the functional groups represented by general formulas (3-1) to (3-8) below, and $R^f$, $R^g$, $R^h$, and $R^i$ are each independently a hydrogen atom or an alkyl group having 1 to 4 carbon atoms.

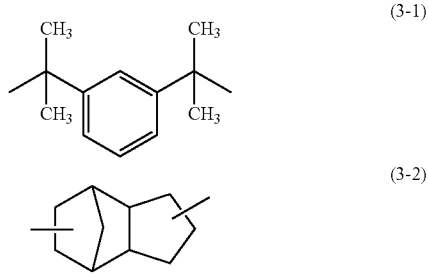

(3-1)

(3-2)

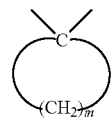

(3-3)

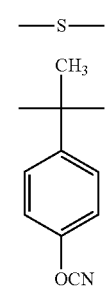

(3-4)

(3-5)

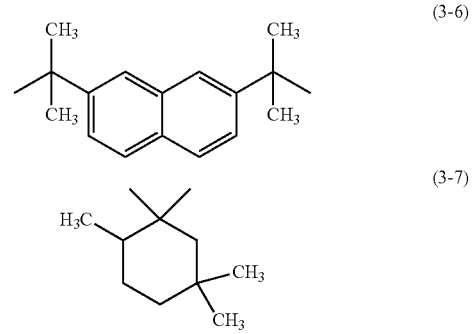

(3-6)

(3-7)

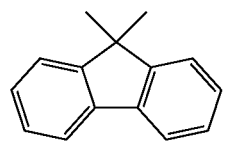

(3-8)

In formula (3-3), m is an integer of 4 to 12.

The amount of the cyanate resin (B) contained in the resin composition according to the present embodiment may be 10 to 200 parts by mass, specifically 30 to 150 parts by mass, and more specifically 50 to 120 parts by mass, based on 100 parts by mass of the total amount of the epoxy compound containing epoxy groups used in the present embodiment. When the amount of the cyanate resin (B) is less than 10 parts by mass, the resultant resin composition can fail to have improved strength. When the amount of the cyanate resin (B) is greater than 200 parts by mass, the resultant resin composition tends to have greatly reduced adhesion to a base material.

The aromatic amine curing agent (C) used in the present embodiment is liquid at 25° C. for easy impregnation into the fiber materials. The aromatic amine curing agent (C) is a compound having amino groups directly bonded to aromatic rings. Examples of the compound include m-phenylenediamine, diaminodiphenyl methane, diamino dimethyl diphenyl methane, diamino diethyl diphenyl methane, diamino diethyl toluene, 1-methyl-3,5-bis(methylthio)-2,4-benzenediamine, and 1-methyl-3,5-bis(methylthio)-2,6-benzenediamine.

Among these curing agents, the resin composition according to the present embodiment may contain diaminodiphenyl methane, diamino diethyl diphenyl methane, or diamino diethyl toluene, and may specifically contain diamino diethyl diphenyl methane to improve the heat resistance of the cured product.

The amount of the aromatic amine curing agent (C) contained in the resin composition according to the present embodiment may be 20 to 90 parts by mass, and may specifically be 40 to 90 parts by mass, based on 100 parts by mass of the total amount of the compound having epoxy groups. When the amount of the aromatic amine curing agent (C) is less than 20 parts by mass or more than 90 parts by mass, the resultant epoxy resin composition will not be cured completely.

The resin composition, which may be cured by heating, may also be cured with activation energy rays to shorten the curing time. Curing taking less time shortens the total operation time, and also uses less energy than curing by heating. This is economically and environmentally advantageous.

Any activation energy rays may be used as appropriate for intended uses. Examples of the activation energy rays include electron rays, ultraviolet rays, infrared rays, laser beams, visible rays, ionizing radiation (e.g., X rays, α rays, (β rays, γ rays), microwaves, and high-frequency waves.

Among these activation energy rays, the method according to the present embodiment may use laser beams and/or infrared rays, and may specifically use infrared rays to increase the curing rate.

Examples of the laser beams include laser beams emitted from a solid-state laser using a ruby, glass, or yttrium aluminum garnet (YAG which is a crystal formed by adding a small amount of rare-earth elements to yttrium, aluminum, and garnet) as a medium, a liquid laser using a solution composed of a coloring agent and solvents such as water or alcohol as a medium, a gas laser using, for example, $CO_2$, argon, or He—Ne mixture gas, and a semiconductor laser using recombination luminescence of semiconductors. The method according to the present embodiment may use a semiconductor laser, which is inexpensive and allows easy control of an output.

The laser beam to be used may have any wavelength. For example, any laser beam having wavelengths in the near-infrared region (with a wavelength of about 0.7 to 2.5 μm) may be used to cure the resin composition.

The laser beam may have any output. For example, a laser beam having an output of 1 W to 4 kW may be used to cure the resin composition.

The laser beam may be irradiated for any length of time, which may range variously depending on the irradiation area or the output of the laser beam. For example, the laser beam may be irradiated within a range of 0.2 to 10 W/mm² to cure the resin composition.

The infrared rays for curing the resin composition may have any wavelength. For example, infrared rays in any wavelength region, such as the near-infrared region (with a wavelength of about 0.7 to 2.5 μm), the mid-infrared region (with a wavelength of about 2.5 to 4 μm), or the far-infrared region (with a wavelength of about 4 to 1000 μm) may be used to cure the resin composition.

The method for irradiating the resin composition with infrared rays for curing may use infrared ray heaters. Examples of the infrared ray heaters include halogen heaters, quartz heaters, sheathed heaters, and ceramic heaters. Halogen heaters can emit infrared rays with wavelengths ranging from the near-infrared region to the mid-infrared region. Quartz heaters, sheathed heaters, and ceramic heaters can emit infrared rays with wavelengths ranging from the mid-infrared region to the far-infrared region. Among these heaters, halogen heaters, which can have their heat sources heated shortly after being powered on, may be used to allow prompt heating.

The infrared rays for curing the resin composition may have any wavelength, which may range variously depending on the absorption area of a photoabsorptive component used. For example, when a nigrosine compound is used as a photoabsorptive component, infrared rays in the near-infrared region (with a wavelength of about 0.7 to 2.5 μm) may be used to cure the resin composition according to the present embodiment in a short time.

The resin composition used in the present embodiment may also contain a photoabsorptive component (D) to enhance curing under the activation energy rays. The photoabsorptive component (D) absorbs the activation energy rays and releases thermal energy to cure the resin composition. To enhance impregnation of the fibers with the resin composition, the photoabsorptive component may be a component that is liquid at 25° C. or that liquefies when mixed and compatibilized with other materials. Examples of such a compound include aniline black, metal complexes, squaric acid derivatives, immonium dyes, polymethine, phthalocyanine compounds, naphthalocyanine compounds, perylene compounds, quaterrylene compounds, and nigrosine compounds. Among these compounds, the resin composition according to the present embodiment may contain a nigrosine compound, which is widely available.

Examples of commercially available nigrosine compounds include BONASORB series, eBIND ACW series, eBIND LTW series, eBIND LAW series, ORIENT NIGROSINE series, and NUBIAN BLACK series (ORIENT CHEMICAL INDUSTRIES COMPANY LIMITED). Among these nigrosine compounds, the resin composition according to the present embodiment may contain NUBIAN BLACK series, which is inexpensive and widely available. These nigrosine compounds may be used alone or in combination.

The amount of photoabsorptive component (D) to be contained in the resin composition ranges from 0.001 to 1% by mass based on the total amount of the composite. To have an intended curing rate and appropriate heat generation (burning) of the resin composition in a well-balanced manner, the amount of the photoabsorptive component (D) used may be 0.01 to 0.5% by mass, and may specifically be 0.05 to 0.2% by mass. When the amount is less than 0.001% by mass, heat generation can be insufficient, and the resin composition may not be cured completely. When the amount is greater than 1% by mass, the activation energy rays will be mostly absorbed by the surface of the resin composition to carbonize only the surface. In this case, the activation energy rays do not penetrate into the resin composition, failing to cure the resin composition completely.

The resin composition may further contain additives as appropriate. Examples of such additives include nonreactive diluents (plasticizers) such as dioctyl phthalate, dibutyl phthalate, benzyl alcohol, and coal tar; pigments; silane coupling agents such as γ-aminopropyltriethoxysilane, N-β-(aminoethyl)-γ-aminopropyltriethoxysilane, N-β-(aminoethyl)-N'-β-(aminoethyl)-γ-aminopropyltriethoxysilane, γ-anilinopropyltriethoxysilane, γ-glycidoxypropyltriethoxysilane, β-(3,4-epoxycyclohexyl)ethyltriethoxysilane, vinyltriethoxysilane, N-β-(N-vinylbenzylaminoethyl)-γ-aminopropyltriethoxysilane, γ-methacryloxypropyltrimethoxysilane, γ-chloropropyltrimethoxysilane, γ-mercaptopropyltrimethoxysilane, and γ-isocyanatopropyltriethoxysilane; titanium coupling agents such as isopropyltriisostearoyltitanate, isopropyltri-n-dodecylbenzenesulfonyltitanate, isopropyltris(dioctylpyrophosphate)titanate, tetraisopropylbis(dioctylphosphite)titanate, tetraoctylbis(ditridecylphosphite)titanate, tetra(2,2-diallyloxymethyl-1- butyl)bis(di-tridecyl)phosphitetitanate, bis(dioctylpyrophosphate)oxyacetatetitanate, bis(dioctylpyrophosphate) ethylenetitanate, isopropyltrioctanoyltitanate, isopropyldimethacryloylisostearoyltitanate, isopropylisostearoyldiacryltitanate, isopropyltri(dioctylphosphate)titanate, isopropyltricumylphenyltitanate, isopropyltri(N-aminoethyl-aminoethyl)titanate, tetraisopropyl titanate, tetra-n-butyltitanate, butyltitanatedimer, tetrakis(2-ethylhexyl)titanate, tetrastearyltitanate, tetramethyltitanate, diethoxybis (acetylacetonato)titanium, diisopropylbis(acetylacetonato) titanium, diisopropoxybis(ethylacetoacetate)titanium, isopropoxy(2-ethyl-1,3-hexanediolato)titanium, di(2-ethylhexoxy)bis(2-ethyl-1,3-hexanediolato)titanium, di-n-butoxybis(triethanolaminato)titanium, tetraacetylacetonatetitanium, hydroxybis(lactato)titanium, dicumylphenyloxyacetatetitanate, and diisostearoylethylenetitanate;

zirconium coupling agents such as irconium tributoxy stearate, tetra(2,2-diallyloxymethyl)butyldi(ditridecyl) phosphitozirconate, neopentyl(diallyl)oxytrineodecanoylzirconate, neopentyl(diallyl)oxytri(dodecyl)benzene-sulfonylzirconate, neopentyl(diallyl)oxytri (dioctyl)phosphatozirconate, neopentyl(diallyl)oxytri (dioctyl)pyro-phosphatozirconate, neopentyl(diallyl) oxytri(N-ethylenediamino)ethylzirconate, neopentyl (diallyl)oxytri(m-amino)phenylzirconate, neopentyl (diallyl)oxytrimethacrylzirconate, neopentyl(diallyl) oxytriacrylzirconate, dineopentyl(diallyl) oxydiparaaminobenzoylzirconate, dineopentyl(diallyl) oxydi(3-mercapto)propylzirconate, tetra-n-propoxyzirconium, tetra-n-butoxyzirconium, zirconium2,2-bis(2-propenolatomethyl)butyrato, zirconiumtetraacetylacetonate, zirconiumdibutoxybis(acetylacetonate), zirconiumdibutoxybis(acetylacetonate), zirconiumtributoxyethylacetoacetate, and zirconiummonobutoxyacetylacetonatebis(ethylacetoacetate);

lubricants such as candelilla wax, carnauba wax, Japan wax, Chinese wax, beeswax, lanolin, spermaceti wax, montan wax, petroleum wax, fatty acid wax, fatty acid ester, fatty acid ether, aromatic ester, and aromatic ether; and additives in common use such as thickening agents, thixotropic agents, oxidation inhibitors, light stabilizers, ultraviolet absorbers, fire retardants, antifoaming agents, and corrosion inhibitors.

Among the above additives, the resin composition according to the present embodiment may contain a silane coupling agent to improve adhesion to the fibers, and may specifically contain γ-aminopropyltriethoxysilane and/or γ-glycidoxypropyltriethoxysilane, and may more specifically contain γ-glycidoxypropyltriethoxysilane, which are widely available and inexpensive.

The amount of the above silane coupling agent, which may be contained in the resin composition, may be 0.1 to 50 parts by mass based on 100 parts by mass of the total amount of the compound having epoxy groups, and may specifically be 7 to 20 parts by mass to have higher miscibility with resins and improve adhesion to the fibers.

Embodiments

Embodiments will now be described in detail with reference to the drawings.

1. Overall Structure

Figure 2:
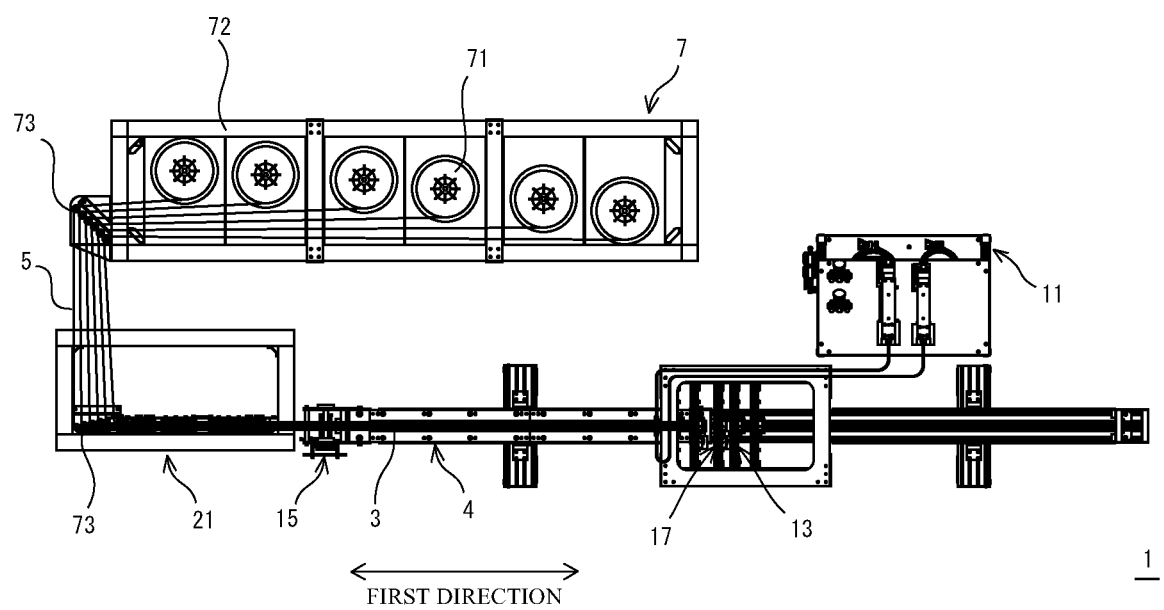
FIG. 2 is a plan view of the molding apparatus.

As shown mainly in FIG. 2, the molding apparatus 1 includes a mold 3, which is long in a first direction, a mold support device 4, which is reciprocable in the first direction and supports the mold 3, a fiber feeder 7, which feeds the fibers 5 to the mold 3, a resin feeder 11, which feeds a resin composition 9 to the mold 3, a curing accelerator 13, which accelerates curing of the resin composition 9 that has been fed into the mold 3, and a transporter 15 (refer to FIG. 4), which reciprocates the mold 3 in the first direction.

A downstream side herein refers to the side to which the fibers 5 fed or to be fed travel, whereas an upstream side refers to the side opposite to the side to which the fibers travel.

In addition to the above components, the molding apparatus 1 may also include at least one of a pressing device 17, which applies a pressure to the fibers 5 and the resin composition 9 that have been fed in the mold 3, a sheet feeder 19 (refer to FIG. 12A), which feeds a sheet (191) for covering the resin composition 9 and the fibers 5 that have been fed in the mold 3, a sheet collecting device that collects the fed sheet (191), and an opening device 21, which opens the fibers 5 that are to be fed into the mold 3.

The molding apparatus 1 according to one embodiment includes the mold 3, the mold support device 4, the fiber feeder 7, the resin feeder 11, the curing accelerator 13, the transporter 15, the pressing device 17, the sheet feeder 19, and the opening device 21. This structure feeds the opened fibers 5 and the resin composition 9 into the mold 3 or the moving mold 3.

These components will now be described.

2. Components (1) Mold

Figure 3:
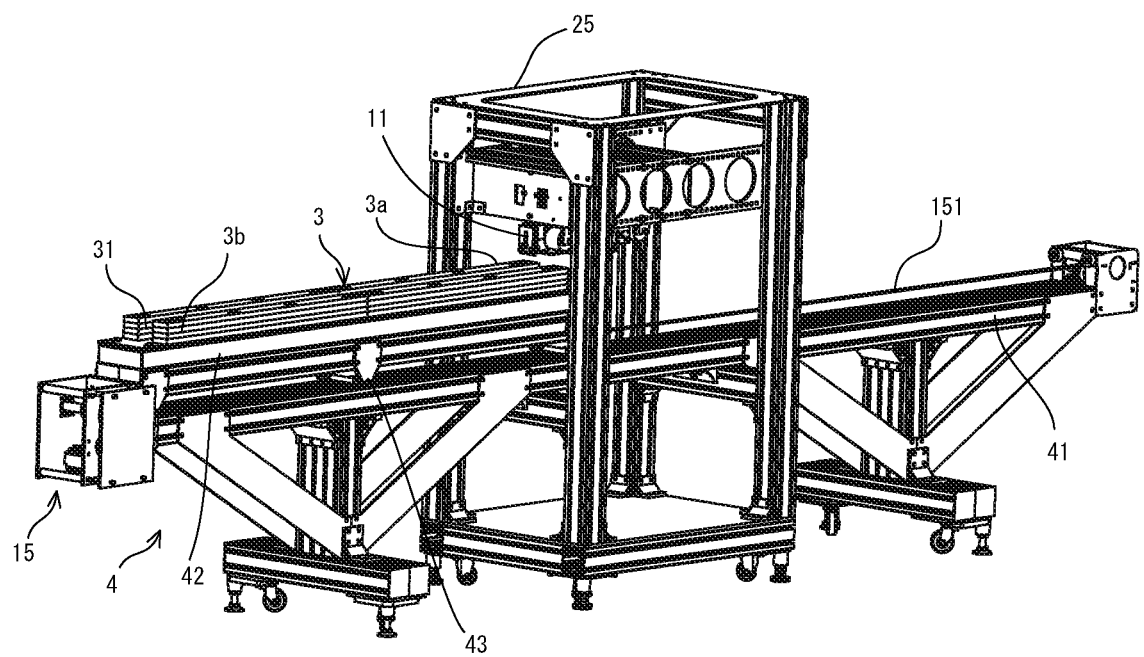
FIG. 3 is a perspective view of a transporter, a fiber feeder, a curing accelerator, and a pressing device.
Figure 4:
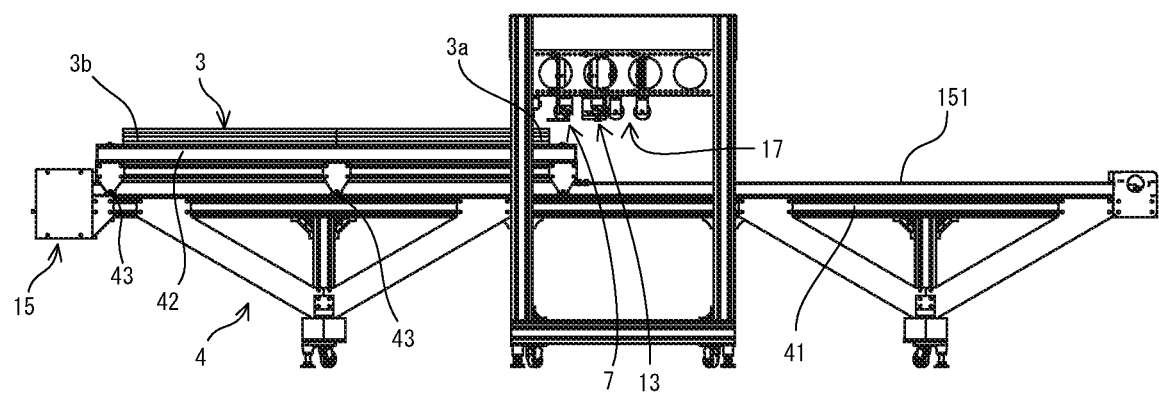
FIG. 4 is a front view of the transporter, the fiber feeder, the curing accelerator, and the pressing device.
Figure 5:
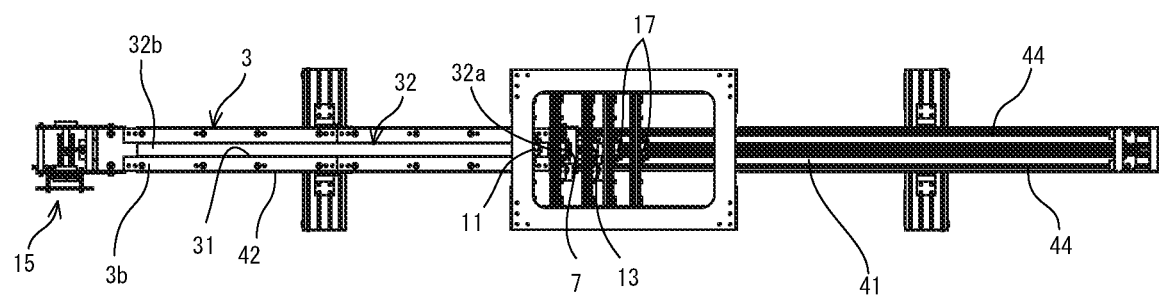
FIG. 5 is a plan view of the transporter, the fiber feeder, the curing accelerator, and the pressing device.

The mold 3 will be described mainly with reference to FIGS. 3 to 5.

The mold 3 has a recess 31 that may be shaped in correspondence with the cross-sectional shape of a molded item. The recess 31 defines the lamination area 32 inside, which allows the fibers 5 and the resin composition 9 to be laminated together. The resin composition 9 and the fibers 5 are fed to the lamination area 32 in the recess 31. The mold 3 is mounted on the mold support device 4. The mold 3 on the mold support device 4 has its longitudinal direction identical to the first direction.

When the resin composition 9 and the fibers 5 are fed to the bottom surface of the recess 31, the bottom surface serves as the lamination area. When the resin composition 9 and the fibers 5 are fed to the top surface of the previously laminated resin composition 9 and the fibers 5 (the resin composition 9 and the fibers 5 may together be referred to as the laminate) in the recess 31, the top surface of the previous laminate serves as the lamination area.

In this example, a front end portion 32a of the lamination area 32 is aligned with a front end portion 3a (an example of a first end according to the present invention) of the mold 3. A rear end portion 32b of the lamination area 32 is aligned with a rear end portion 3b (an example of a second end according to the present invention) of the mold 3. These end portions of the lamination area 32 may not be aligned with the corresponding end portions of the mold 3. For example, the lamination area 32 may be defined in a center portion, a front portion, or a rear portion of the recess 31, which extends in a direction in the mold 3, or may be defined in a plurality of (e.g., two) portions in the recess extending in a direction.

(2) Mold Support Device

The mold support device 4 will be described mainly with reference to FIGS. 2 to 5.

The mold support device 4 includes a fixed table 41, which extends in the first direction, and a movable table 42, which is reciprocable in the first direction on the top surface of the fixed table 41. Although a moving mechanism for the movable table 42 is not limited, the movable table 42 includes wheels 43 in the present embodiment.

The movable table 42 advances toward the downstream side and retracts toward the upstream side.

The movable table 42 includes a plurality of (three) pairs of wheels 43 on its right and left sides, which are rotatable in the advancing or retracting direction, and are spaced from one another in the first direction. The fixed table 41 has, on the right and left sides of its top surface, a pair of grooves 44 that extend in the first direction. The movable table 42 reciprocates in the first direction with one pair of wheels 43 of the movable table 42 rotating within the pair of grooves 44 of the fixed table 41. This structure allows the movable table 42 to reciprocate (advance and retract) on the same path.

When the movable table 42 is at the rearmost position in the first direction, the movable table is at a standby position. When the movable table 42 is at the foremost position, the movable table 42 is at a finish position.

(3) Fiber Feeder

Figure 6:
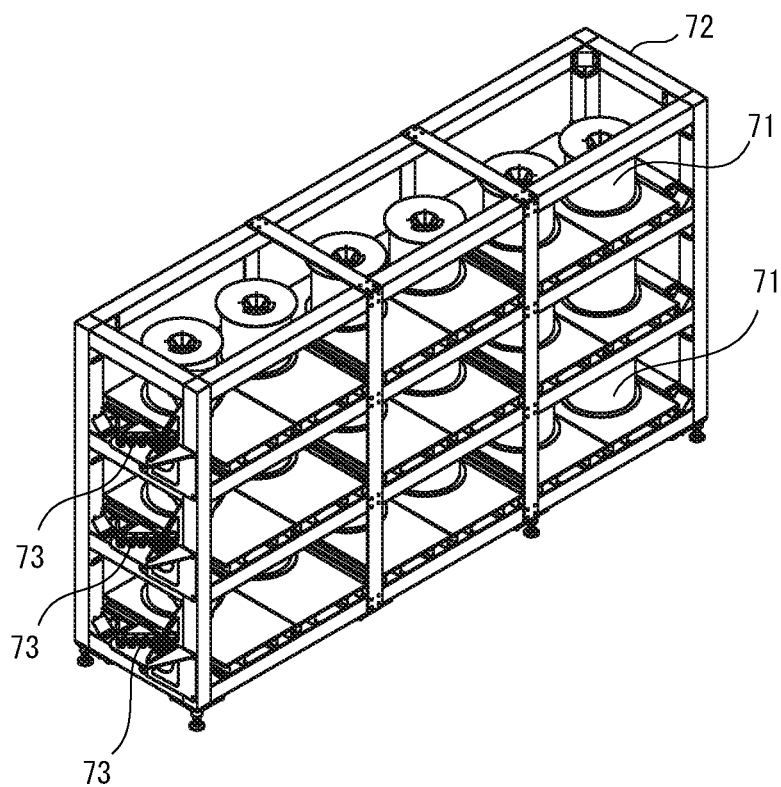
FIG. 6 is a perspective view of the fiber feeder.
Figure 7:
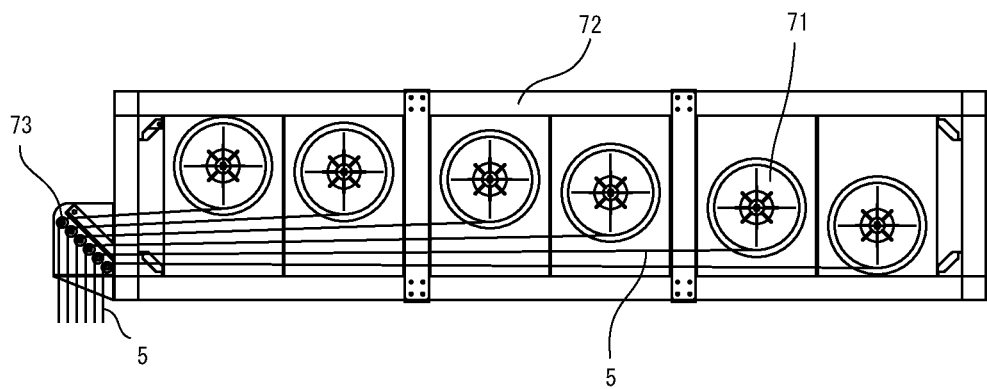
FIG. 7 is a plan view of the fiber feeder.

The fiber feeder 7 will be described with reference to FIGS. 2, 6, and 7.

The fiber feeder 7 guides the fibers 5, which are drawn from, for example, rovings 71, to the feeding position. The feeding position is at the front end portion 32a of the lamination area 32 of the mold 3 at the standby position. The fiber feeder 7 includes a support rack 72, which supports the rovings 71, guide rollers 73, which guide the fibers 5 drawn from the rovings 71 to the front end portion 32a of the lamination area 32 at the standby position, and a roller 74 (refer to FIG. 8), which feeds the guided fibers 5 while pressing the fibers 5 against the mold 3.

Figure 8:
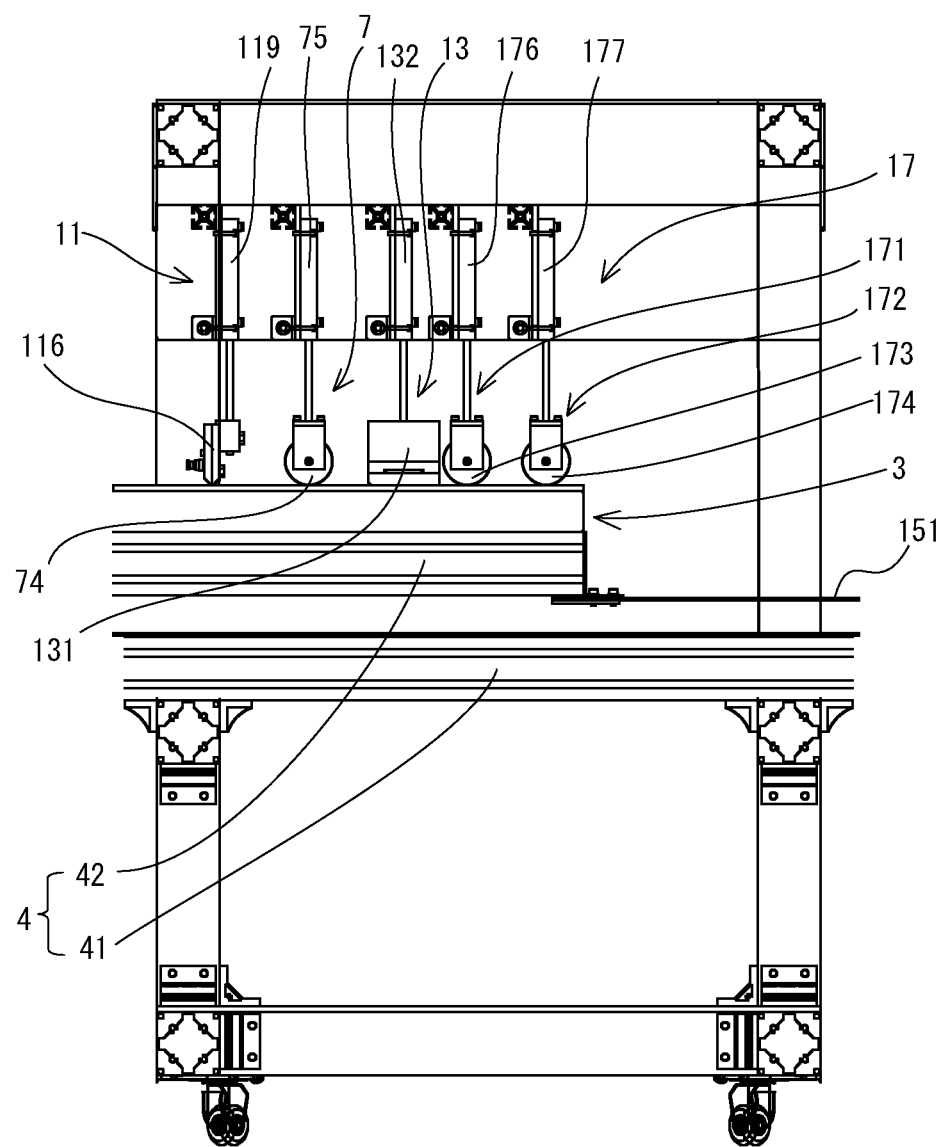
FIG. 8 is an enlarged front view of the fiber feeder, the curing accelerator, and the pressing device.

The roller 74 is driven to rotate as the mold 3 advances. The guided fibers 5 are fed continuously to the mold 3. As shown in FIG. 8, the roller 74 is supported by an actuator 75 in a manner movable in a direction toward and away from the mold 3 (in the vertical direction in this example).

(4) Resin Feeder

Figure 9:
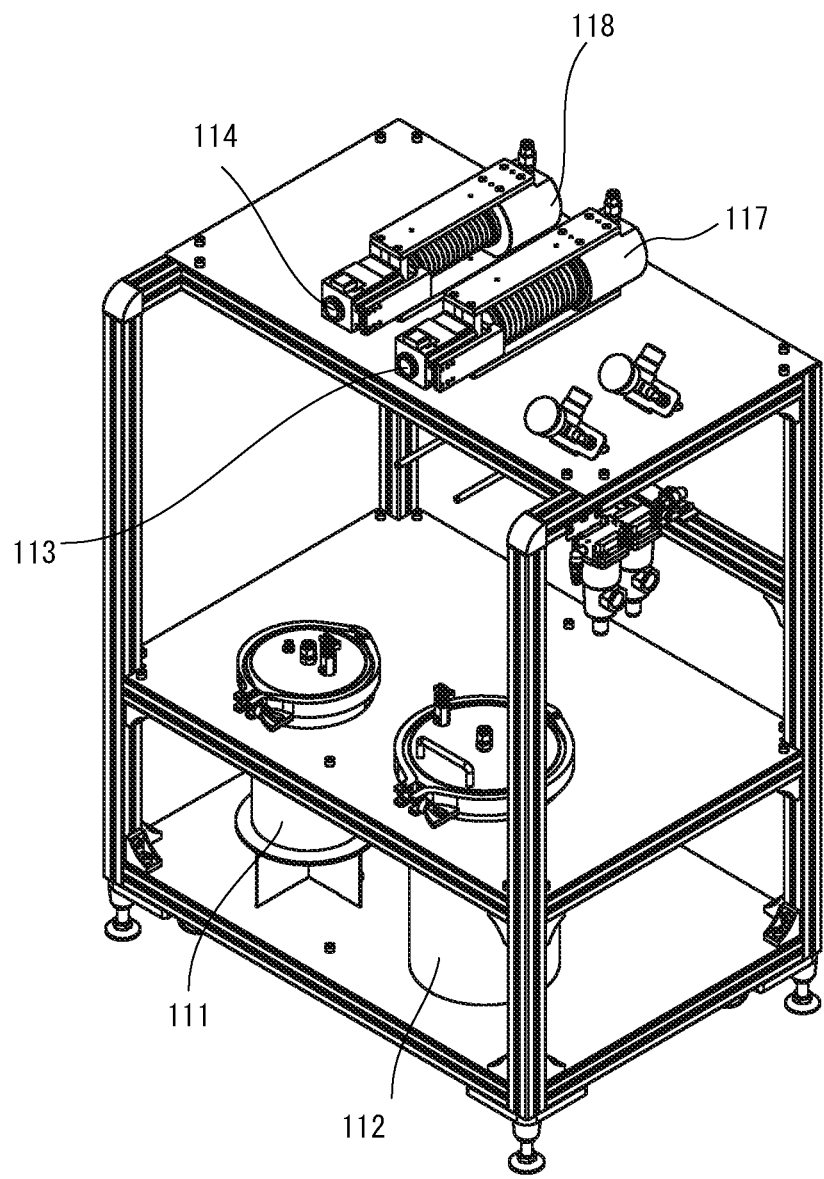
FIG. 9 is a perspective view of a portion of a resin feeder.

The resin feeder 11 will be described with reference to FIGS. 8 and 9.

The resin feeder 11 feeds the resin composition 9 to the lamination area 32. In other words, the resin feeder 11 feeds the resin composition 9 from the front end portion 3a to the rear end portion 3b of the mold 3. The resin feeder 11 according to the present embodiment includes an ejecting unit that ejects the resin composition 9, although a unit for feeding the resin composition 9 is not limited.

The ejecting unit includes a base component storage tank 111, which stores a base component, a curing-agent storage tank 112, which stores a curing agent, a base component discharging cylinder 113, which feeds the base component from the base component storage tank 111 to a mixer, a curing-agent discharging cylinder 114, which feeds the curing agent from the curing-agent storage tank 112 to a mixer, a mixer that mixes the base component and the curing agent fed to the mixer, and an ejection nozzle 116, which ejects the mixed resin composition 9.

The discharging cylinders 113 and 114 are driven by actuators 117 and 118. The ejection nozzle 116 is supported by an actuator 119 in a manner movable toward and away from the mold 3 (in the vertical direction in this example).

The ejection nozzle 116 in the resin feeder 11 is arranged upstream from the roller 74 in the fiber feeder 7. More specifically, the resin feeder 11 feeds the resin composition 9 into the mold 3 before the fibers 5 are fed into the mold 3.

(5) Curing Accelerator

The curing accelerator 13 will be described with reference to FIG. 8.

The curing accelerator 13 applies energy (thermal energy or activation energy) for accelerating curing of the resin composition 9 fed into the mold 3 to the resin composition 9.

The curing accelerator 13 according to the present embodiment includes an energy applying unit that emits thermal energy.

Although the energy applying unit for applying thermal energy is not limited, the energy applying unit may be an iron 131. The iron 131 is supported by an actuator 132 in a manner movable toward and away from the mold 3 (in the vertical direction in this example).

The curing accelerator 13 may include a single iron 131, or a plurality of irons 131 in the first direction.

(6) Transporter

The transporter 15 will be described with reference to FIGS. 3 and 4.

The transporter 15 may move the movable table (mold) 42 in the mold support device 4 at least from the standby position to the finish position. The transporter 15 herein allows the movable table 42 to reciprocate in the first direction. More specifically, the transporter 15 allows the movable table 42 to advance from the standby position to the finish position, and to retract from the finish position to the standby position.

Although the moving method is not limited, the transporter 15 in the present embodiment includes a belt drive. The belt drive includes a belt 151 having one end attached to the front end portion of the movable table 42 and the other end attached to the rear end portion of the movable table 42, a belt roller (not shown) 153, which winds and unwinds the belt 151, and a motor (not shown) that drives and rotates the belt roller 153. The motor is arranged at the rear end portion of the fixed table 41.

(7) Pressing Device

The pressing device 17 will be described with reference to FIG. 8.

The pressing device 17 applies a compressive force on the fibers 5 that have been fed in the mold 3. More specifically, the pressing device 17 presses the fibers 5 against the mold 3.

Although compressing units that apply a compressive force are not limited, the pressing device 17 includes pressing rollers 171 and 172 as compressing units. The pressing roller 171 includes a roller 173 and an actuator 176. The pressing roller 172 includes a roller 174 and an actuator 177. Each of the rollers 173 and 174 has a rotation axis perpendicular to the first direction (axis extending laterally when viewed in the first direction). Each of the actuators 176 and 177 presses the corresponding roller 173 or 174 against the mold 3.

The pressing device 17 may be arranged upstream from the curing accelerator 13. The roller 74 in the fiber feeder 7 may also serve as the pressing device 17. The pressing device 17 may include a first compressing unit that uses the roller 74 in the fiber feeder 7, and a second compressing unit that uses the pressing rollers 171 and 172 arranged downstream from the curing accelerator 13.

(8) Sheet Feeder

The sheet feeder 19 will be described mainly with reference to FIGS. 12A to 12C.

The sheet feeder 19 feeds a sheet to prevent the resin composition 9 from adhering to the roller 74 and the pressing rollers 171 and 172 when the fibers 5 are pressed.

The sheet feeder 19 feeds a sheet 191 to the surfaces (opposite to the mold) of the fibers 5. Although not limited to a particular feeder for the sheet 191, the sheet feeder 19 includes a sheet feeding unit including a guide roller for guiding the sheet 191 toward the surfaces of the fibers 5, and a roller that presses the sheet 191 against the surfaces of the fibers 5.

The roller 74 in the fiber feeder 7 may also serve as the roller, and the guide rollers 73 in the fiber feeder 7 may also serve as the guide rollers.

(9) Opening Device

Figure 10:
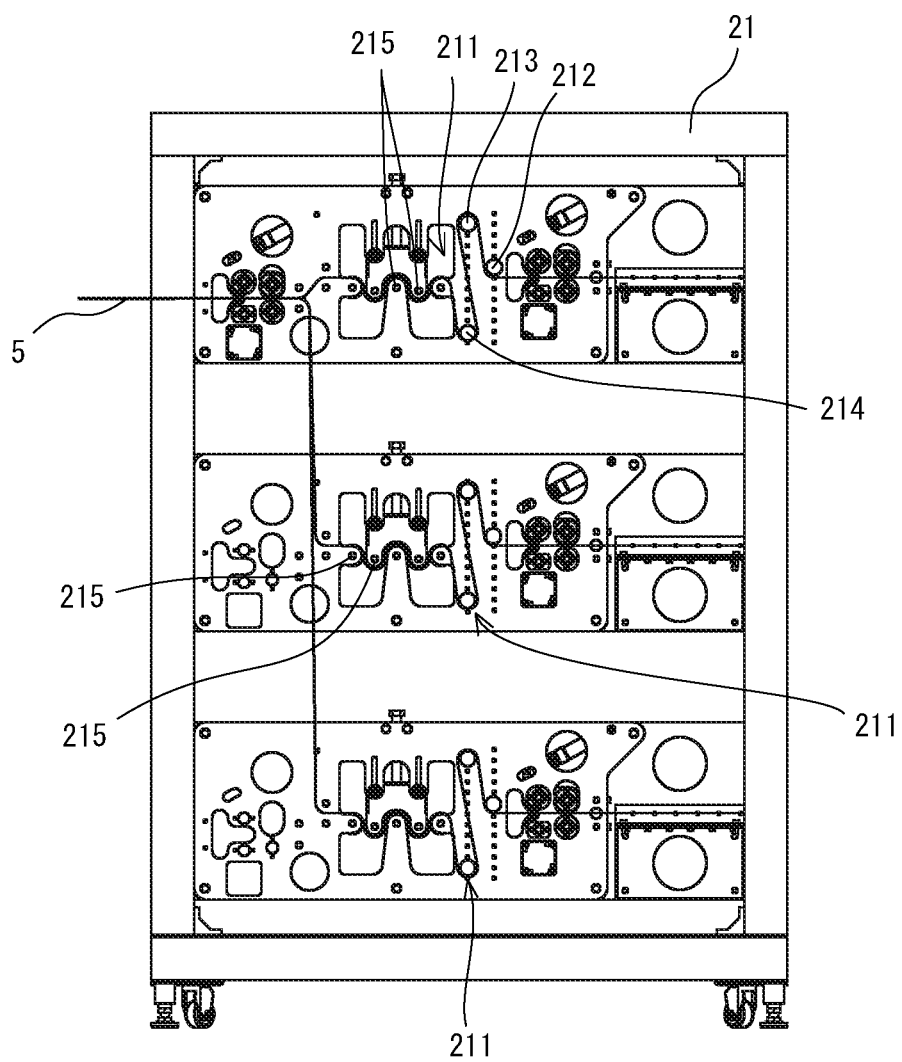
FIG. 10 is a front view of an opening device.
Figure 11:
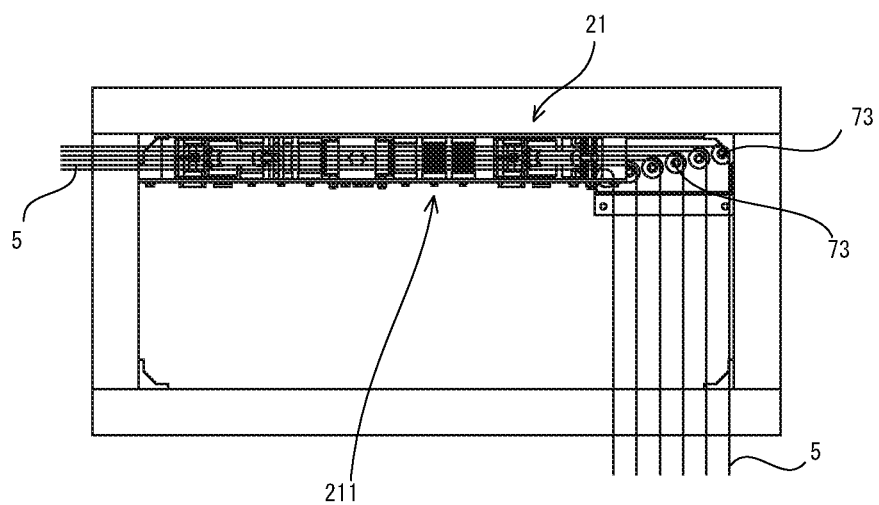
FIG. 11 is a plan view of the opening device.

The opening device 21 will be described with reference to FIGS. 2, 10, and 11.

The opening device 21 is arranged between the support rack 72 and the roller 74 (refer to FIG. 8) in the fiber feeder 7. Although the method for opening the fibers 5 (opening unit) is not limited, the opening device 21 includes a dancer roller 211 as an opening unit, which applies a pressure to the fibers 5.

The dancer roller 211 includes a plurality of rollers 212 to 215, at least one of which is a roller (e.g., the roller 214) movable in the direction to increase or decrease the tension applied on the fibers 5. The tension increases when the roller moves downward. These rollers 212 to 215 are flat rollers.

3. Lamination Process

FIGS. 12A to 15C are diagrams each describing the operation of the molding apparatus 1.

FIGS. 12A to 15C are enlarged views of main portions for easy understanding of ejection of the resin composition 9, laminating of the fibers 5, curing acceleration, and other operations. To simplify the drawings, the mold 3 is not shown in FIG. 12B and subsequent drawings.

Figure 12A:
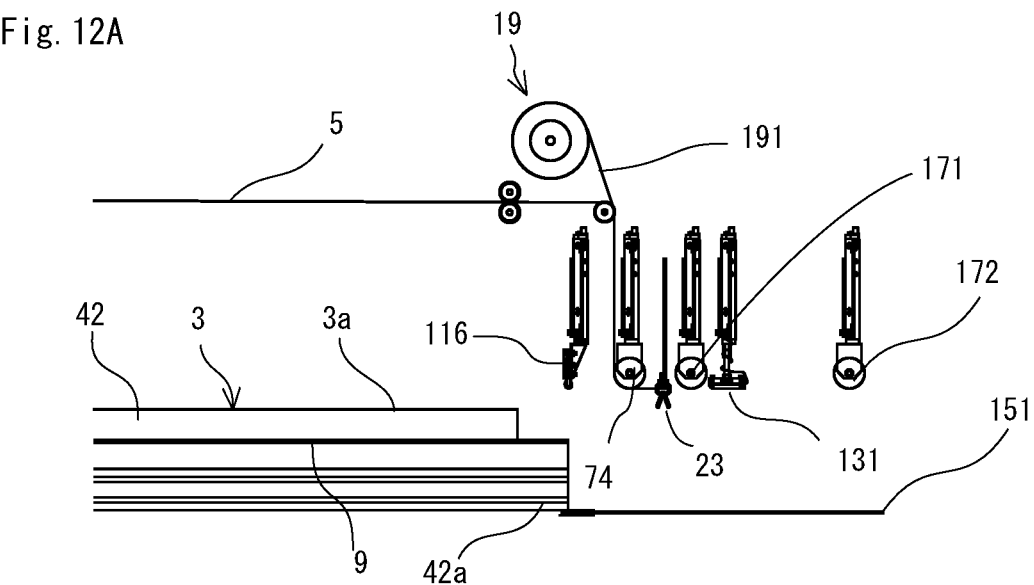
FIGS. 12A to 12C are diagrams describing the operation of the molding apparatus.

As shown in FIG. 12A, the molding apparatus 1 includes, from its upstream, the ejection nozzle 116 for the resin feeder 11, the roller 74 in the fiber feeder 7, the pressing roller 171 in the pressing device 17, the iron 131 in the curing accelerator 13, and the pressing roller 172 in the pressing device 17. The pressing roller 172 in the pressing device 17 arranged most downstream prevents expansion of the laminate that may occur when the iron 131 heats the resin composition 9.

The operation of the molding apparatus 1 and processes included in the method for manufacturing, for example, a large molded item using the molding apparatus 1 will now be described. The front end portion 32a of the lamination area 32 hereafter equates to the front end portion 3a of the mold 3, and the rear end portion 32b of the lamination area 32 to the rear end portion 3b of the mold 3.

(1) Mold Alignment and Fixing of Fibers

As shown in FIG. 12A, the movable table 42 is positioned to place the front end portion 3a of the mold 3 upstream from the ejection nozzle 116 of the resin feeder 11.

The fibers 5 are drawn from the rovings 71, guided toward the roller 74 in the fiber feeder 7 via the guide rollers 73 and the opening device 21, and then installed on a fixture 23.

The sheet 191 is fed to the surfaces of the fibers 5 by the sheet feeder 19 in parallel with the feeding of the fibers 5, and is then installed on the fixture 23 in parallel with the installation of the fibers 5.

(2) Fixing Fibers on Mold

Figure 12B:
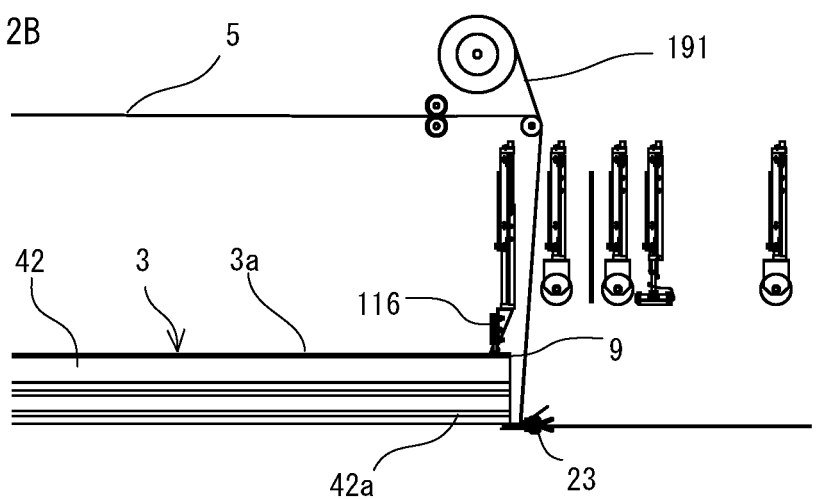

As shown in FIG. 12B, the fixture 23 on which the fibers 5 and the sheet 191 are installed is fixed on the mold 3. Although the fixture 23 is fixed to a front end portion 42a of the movable table 42 in this example, the fixture 23 may be fixed to the mold.

The fibers 5 and the sheet 191 may be fixed on the extension line of the recess 31 of the mold 3 extending in the first direction when viewed from above. FIG. 12B shows the movable table 42 at the position slightly advanced from the position shown in FIG. 12A.

(3) Mold Movement and Resin Ejection

After the fixture 23 is fixed, the transporter 15 advances the movable table 42. In the operation described below, the movable table 42 advances. The movable table 42 advances when it is driven by a belt drive included in the transporter 15.

The ejection nozzle 116 in the resin feeder 11 is lowered when the front end portion 3a of the mold 3 approaches the ejection nozzle 116. When the front end portion 3a reaches under the ejection nozzle 116, as shown in FIG. 12B, the ejection nozzle 116 starts feeding (ejecting) the resin composition 9. The resin composition 9 is continuously fed by the ejection nozzle 116 ejecting the resin composition 9 toward the recess 31 of the mold 3 until the rear end portion 3b reaches under the ejection nozzle 116.

(4) Feeding Fibers

Figure 12C:
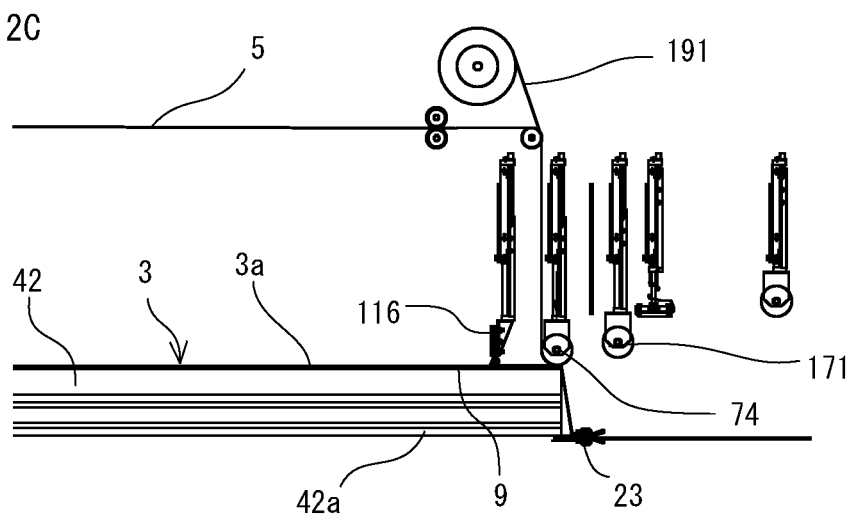

As shown in FIG. 12C, the roller 74 in the fiber feeder 7 is lowered when the front end portion 3a of the mold 3 approaches the roller 74. The roller 74 is placed in the recess 31 of the mold 3, and the fibers 5 are held between the lowered roller 74 and the mold 3. The roller 74 is rotated as the mold 3 advances. This structure enables continuous feeding of the fibers 5 while pressing the fibers 5 against the mold 3 without using a specific device.

The roller 74 is rotated as the mold 3 advances, and is thus less likely to damage the fibers 5. The sheet 191 is fed to the surfaces of the fibers 5. The sheet 191 protects the fibers 5 from, for example, damage when the fibers 5 are pressed by the roller 74. The sheet 191 placed between the resin composition 9 and the roller 74 also prevents the resin composition 9 from adhering to the roller 74.

(5) Pressing Resin and Fibers

Figure 13A:
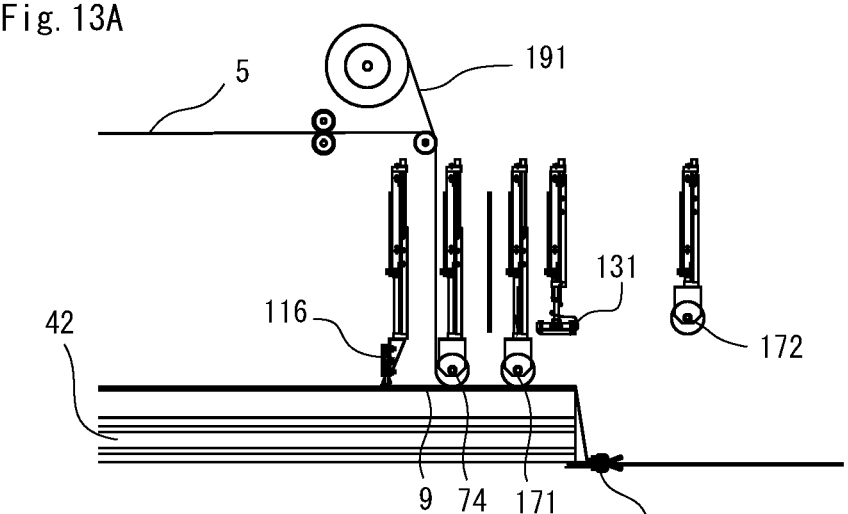
FIGS. 13A to 13C are diagrams describing the operation of the molding apparatus.

As shown in FIG. 12C, when the front end portion 3a of the mold 3 approaches the upstream pressing roller 171, the pressing roller 171 is lowered. When the movable table 42 advances further, as shown in FIG. 13A, the pressing roller 171 presses the resin composition 9 and the fibers 5 fed to the front end portion 3a. This causes the fibers in the fibers 5 to be impregnated with the resin composition 9.

(6) Resin composition Curing Acceleration

Figure 13B:
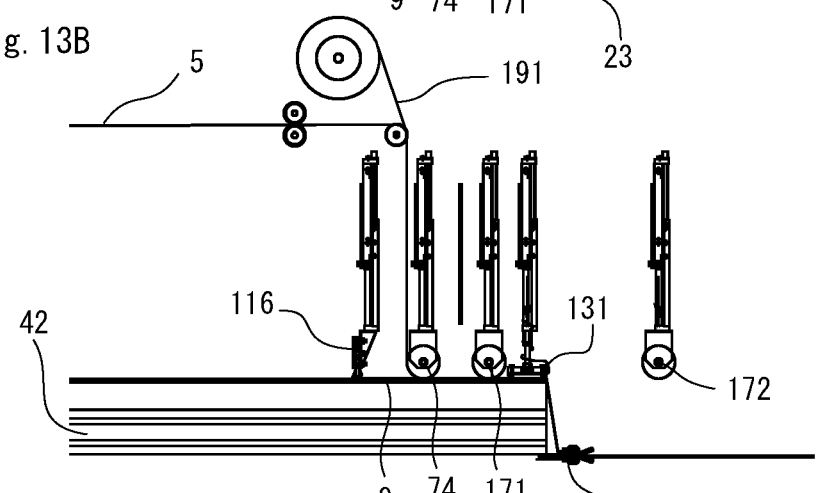

As shown in FIG. 13B, the iron 131 is lowered when the front end portion 3a of the mold 3 approaches the iron 131. The iron 131 heats the resin composition 9 and the fibers 5 fed to the front end portion 3a (applies energy for curing acceleration to the resin composition 9). This operation accelerates curing of the resin composition 9. The acceleration may be continued until the tensioned fibers 5 become unremovable from at least the resin composition in which curing is accelerated.

The resin composition 9 used herein is a fast-cure resin composition. The movable table 42 can thus advance continuously without being stopped.

(7) Continuously Feeding Resin and Fibers

Figure 13C:
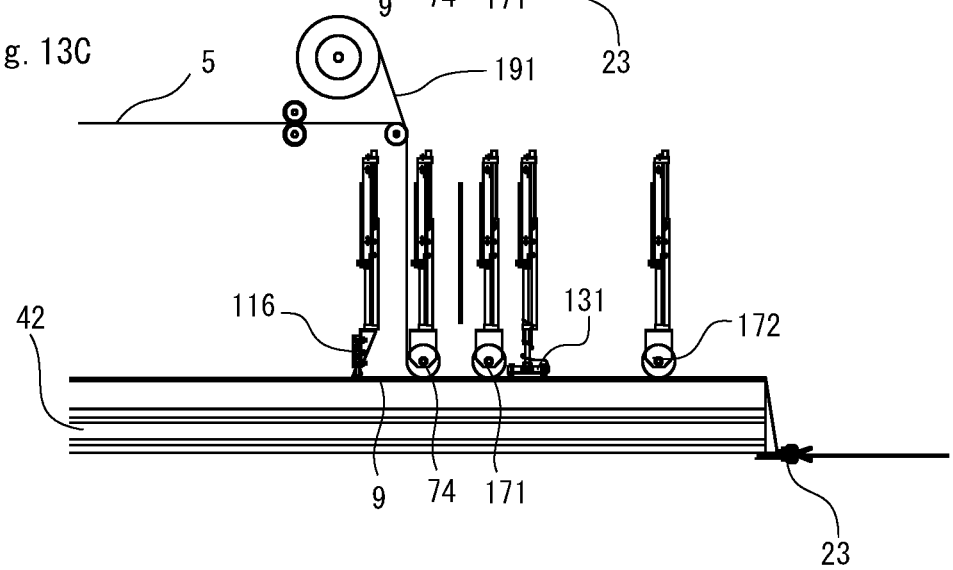

The movable table 42 continues to advance while curing of the resin composition 9 is accelerated. As shown in FIG. 13C, the resin composition 9, the fibers 5, and the sheet 191 are fed continuously. During feeding, the fibers 5 are tensioned as the movable table 42 moves and by a component such as the dancer roller 211, which serves as an opening unit. This reduces waviness or deformation of the fibers 5 when the fibers 5 are laminated.

After the curing acceleration of the resin composition 9 in the front end portion 3a, the transporter 15 may increase the transportation speed of the movable table 42. In this case, the resin composition 9 fed to a middle portion of the mold 3 is not cured to the degree to which the resin composition 9 is cured in the front end portion 3a, and the sheet 191 is removable from the laminate.

(8) Stopping Resin Feeding

Figure 14A:
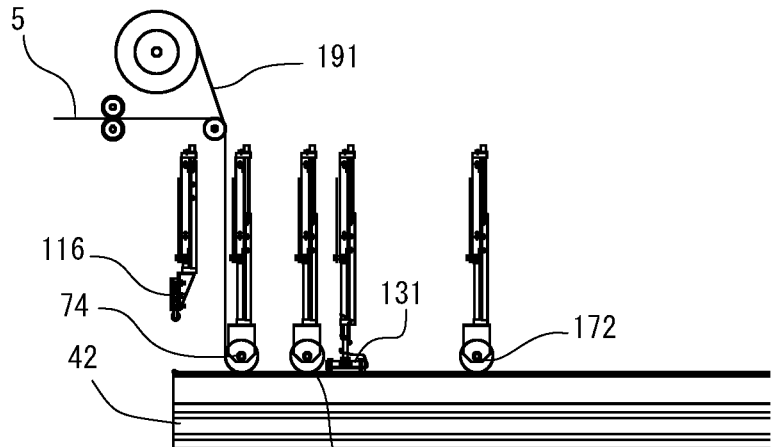
FIGS. 14A to 14C are diagrams describing the operation of the molding apparatus.

When the rear end portion 3b of the mold 3 reaches the ejection nozzle 116 as shown in FIG. 14A, the resin feeder 11 stops feeding the resin composition 9 and raises the ejection nozzle 116. In this state, the movable table 42 continues to advance.

(9) Accelerating Curing in Rear End Portion and Stopping Movable Table

Figure 14B:
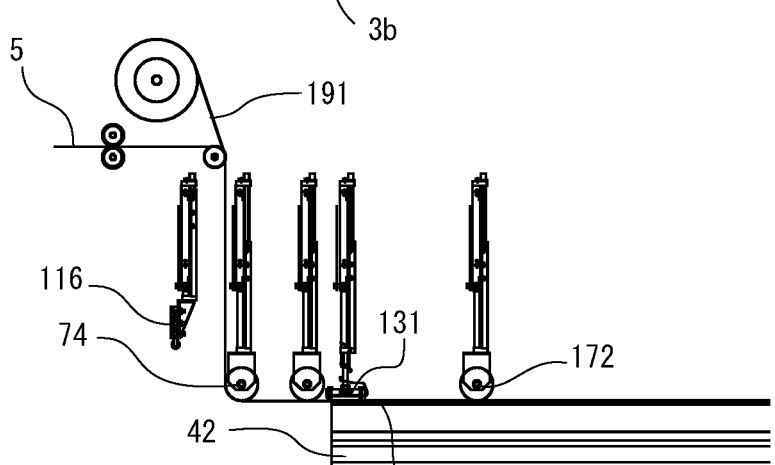
Figure 14C:
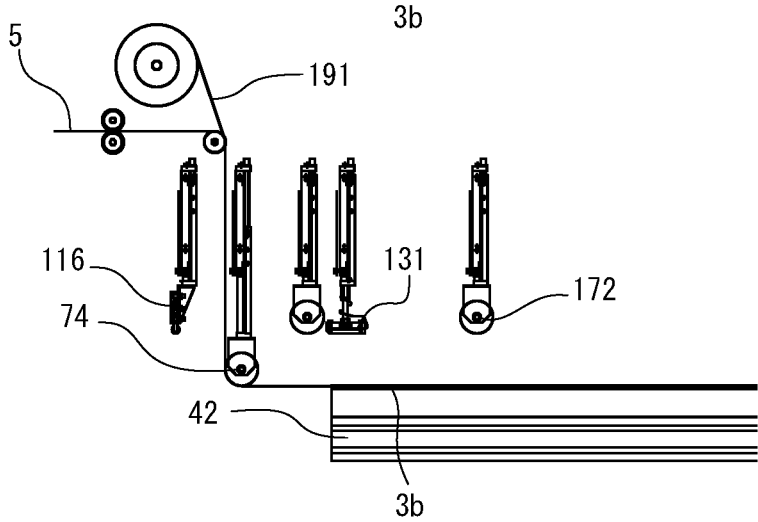

As shown in FIG. 14B, the transporter 15 decreases the transportation speed of the movable table 42 or stops the movable table 42 (decreases the transportation speed in this example) when the rear end portion 3b of the mold 3 approaches under the iron 131. This accelerates curing of the resin composition 9 fed to the rear end portion 3b. After the curing acceleration, as shown in FIG. 14C, the transporter 15 stops the movable table 42. This further accelerates curing of the resin composition 9 fed to the rear end portion 3b. The acceleration may be continued until the tensioned fibers 5 become unremovable from the resin composition 9 fed to the rear end portion 3b of the mold 3.

This allows the fibers 5 fed to a middle portion of the mold 3 between the front end portion 3a and the rear end portion 3b to remain tensioned, and reduces waviness or deformation of the fibers 5.

(10) Raising the Iron

When curing of the resin composition 9 in the rear end portion 3b of the mold 3 is accelerated, the iron 131 is raised, in parallel with or followed by the pressing device 17 raising the pressing roller 172 as shown in FIG. 14C.

(11) Cutting Fibers

Figure 15A:
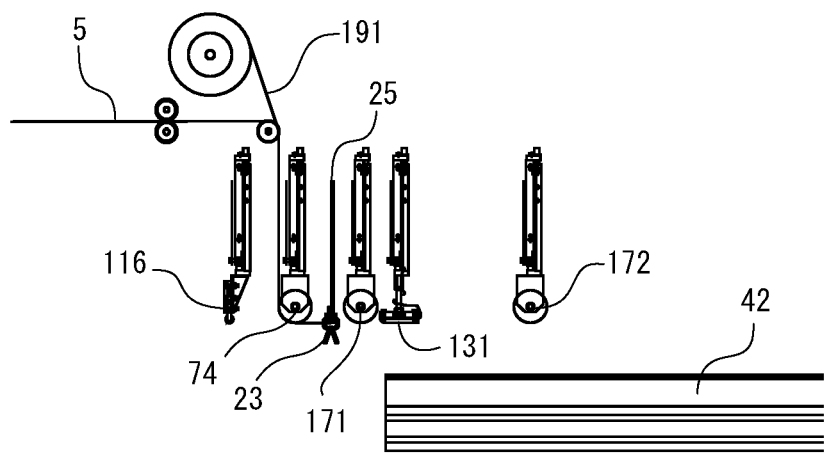
FIGS. 15A to 15C are diagrams describing the operation of the molding apparatus.

After the pressing roller 172 is raised, the fibers 5 are cut as shown in FIG. 15A. After cut, the fibers 5 fed into the mold 3 have both ends fixed in the resin composition 9 for which curing has been accelerated, and remain tensioned.

The cut fibers 5 are fixed, together with the fixture 23, on a frame 25, which supports components including the ejection nozzle 116 and the roller 74.

(12) Removing Sheet

The sheet 191 fed to the fibers 5 is removed after curing of the resin composition 9 fed to the rear end portion 3b of the mold 3 is accelerated. The sheet 191 may be difficult to remove from the portions of the resin composition 9 in which curing of the resin is accelerated, which are the front end portion 3a and the rear end portion 3b of the mold 3. The cured portions, which form the front and rear end portions of the laminate, are to be cut off, and do not affect the resultant molded item.

(13) First Curing

Figure 15B:
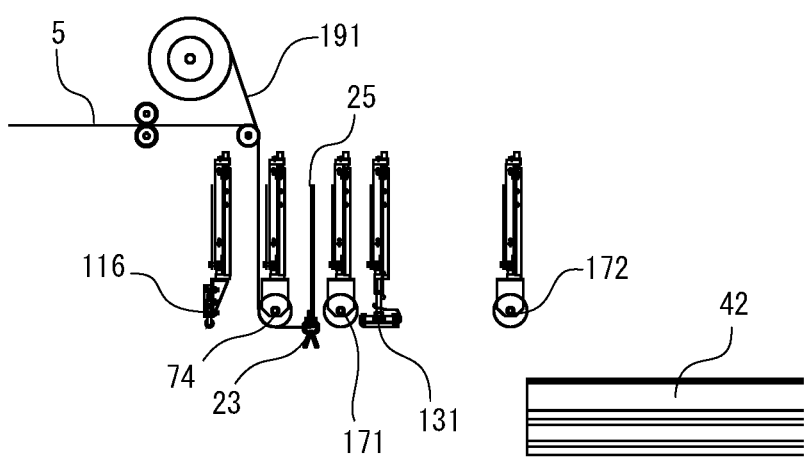

The movable table 42 advances further. As shown in FIG. 15B, the resin composition 9 fed into the mold 3, or particularly the resin composition 9 fed to a middle portion of the mold 3, then undergoes first curing with acceleration.

(14) Moving the Mold to Standby Position

When the resultant laminate has a thickness equal to a target thickness of a molded item, the laminate is removed from the mold, and then undergoes second curing as appropriate.

Figure 15C:
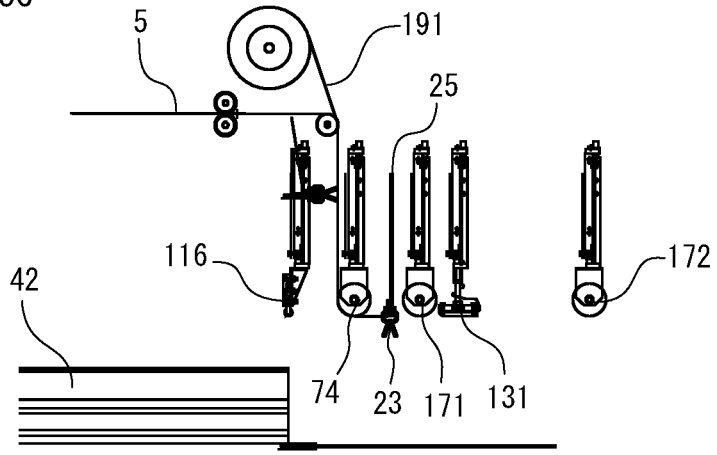

When the resultant laminate has a thickness less than a target thickness, the movable table 42 retracts to the standby position as shown in FIG. 15C, and the processes (1) to (14) described above are repeated until the laminate will have the target thickness.

Modifications

The molding apparatus 1 according to the embodiment is not limiting. The embodiment may be modified as described below. The embodiment and at least one of the modifications may be combined or the modifications may be combined with one another. Examples that are not described in the embodiment or modifications or design changes without departing from the gist of the invention also fall within the scope of the present invention.

1. Accelerating Curing (1) Movable Table

Although curing of the resin composition is accelerated while the movable table 42 is being moved in the present embodiment, curing of the resin composition may be accelerated while, for example, the movable table 42 is being stopped.

(2) Accelerating Curing

The iron 131 in the embodiment accelerates curing from the front end portion 32a to the rear end portion 32b of the lamination area 32. However, curing of the resin composition may be accelerated at least at the front end portion 32a and the rear end portion 32b of the lamination area 32. For example, the iron may be raised in a middle portion of the lamination area 32.

(3) Unit for Acceleration

Although the single iron 131 serving as an example of a heating unit is used to accelerate curing of the resin composition in the embodiment, a plurality of heating units such as irons may be arranged in the direction in which the movable table moves when the laminate is thick or when the efficiency of lamination (production efficiency) is to be enhanced.

The iron 131 as a heating unit in the above embodiment may be replaced by a heat gun that blows hot air or a heating furnace covering the laminate. When a plurality of heating units are used, these heating units may be of the same type or different types.

(4) Unit for Energy Application

Although the energy applying unit that emits thermal energy (iron 131) is used in the embodiment, an energy applying unit that emits activation energy may be used.

The energy applying unit that emits activation energy is not limited and may be any unit that emits activation energy rays, such as infrared rays. For example, an infrared heater (e.g., a halogen heater) may be used.

2. Feeding Fibers (1) Tensioning Timing

The fibers 5 are fed to the lamination area 32 while being tensioned in the above embodiment. In other embodiments, the fibers inside the lamination area are tensioned at least after the curing of the resin composition is accelerated in the front end portion of the lamination area. The tension may be applied when the curing acceleration is complete, and raised to, for example, a target value. This allows easier constraining of the fibers during curing acceleration.

Although the fibers are fed while being tensioned, the fibers may have waviness or deformation if the fibers are loosened as curing of the resin in the rear end portion of the lamination area is accelerated. To prevent the fibers from loosening, the fibers may be tensioned while being fed and also may remain tensioned while curing of the resin composition in the rear end portion of the lamination area is accelerated.

The tensioned fibers, which may loosen in a middle portion of the lamination area, may be re-tensioned when curing of the resin composition in the rear end portion is accelerated to eliminate waviness or deformation. This allows the fibers to be tensioned at least when curing of the resin in the rear end portion is accelerated.

(2) Tension

Although not described in the embodiment, any level of tension may be applied to the fed fibers laminated in the lamination area. The level of tension may fall within the range of values greater than 0 mN/tex and less than 100 mN/tex, or in the range of values greater than 0 mN/tex and less than 50 mN/tex. The tension is a set (target) value during feeding of the fibers.

(3) Opening Fibers

Although the fibers are opened and fed in the embodiment, the fibers drawn from the rovings may be fed without being opened. The fibers opened and fed are more easily impregnated with a resin. Although the dancer roller 211 is used as an opening device in the embodiment, the opening device may be another unit, such as a nip roller, an opening roller (grooved roller), or an air jet. The opening roller (grooved roller) has grooves that can divide the width of fibers into three to five sections. The opening roller can open the fibers by simply applying tension against the fibers on the roller.

3. Curing Device

In the embodiment, the resin composition undergoes first curing after the movable table 42 reaches the downstream end. The curing device instead may be arranged at a position upstream from the position at which the movable table reaches the downstream end, and may allow the first curing or the curing to be complete by the time when the movable table reaches the downstream end.

The curing device may be, for example, a tunnel furnace. For a photo-curing resin, an irradiation device that emits light (e.g., an ultraviolet lamp, an infrared lamp, a light-emitted diode or LED, or a laser) may be used.

4. Mold

The single mold 3 is used in the embodiment. However, the curing device for curing resin before the movable table reaches the downstream end may be arranged upstream from the downstream end in a first direction that is the moving direction of the movable table, which may then move from the downstream side to the upstream side along a path different from the movement path. This allows a molded item almost endless in the first direction to be obtained.

5. Impregnator

(1) Impregnation Method

Although the impregnation of the fibers 5 with the resin composition 9 is performed using a pressure in the embodiment, the impregnation may be performed with another method. Examples include lowering the viscosity of the resin by, for example, heating. The curing accelerator for a curable resin may also serve as the impregnator.

(2) Pressing Device

The pressing roller in the pressing device is arranged upstream from the curing accelerator 13 in the embodiment. The pressing roller may be arranged upstream from the curing accelerator when the viscosity of the fed resin increases through accelerated curing without decreasing. When the viscosity of the fed resin first decreases temporarily and then increases, the pressing roller may be arranged downstream from the curing accelerator. Pressing devices may be arranged both upstream and downstream from the curing accelerator.

6. Sheet Collecting Device

Although the molding apparatus includes no sheet collecting device in the embodiment, the molding apparatus may include a sheet collecting device. For example, the sheet collecting device collects the sheet 191 removed from the resin composition 9 that is yet to be cured. The sheet collecting device collects the sheet 191 at a position downstream from at least the pressing roller. The sheet collecting device includes a collection roller for winding the sheet 191.

EXAMPLES

Examples of the present invention and comparative examples will now be described.

The percentage referred to in the examples and others below is the percentage by mass unless otherwise specified.

Example 1

As shown in Table 1, 50 g of ADEKA RESIN EP-4901E (bisphenol F epoxy resin, ADEKA CORPORATION, epoxy equivalent: 170 g/eq.) and 50 g of ADEKA RESIN EP-4005 (ADEKA CORPORATION, epoxy equivalent: 510 g/eq.), which serve as epoxy resin (A), and 100 g of LECy (1,1-bis(4-cyanatophenyl)ethane, LONZA), which serves as cyanate resin (B), were placed into a base component storage tank 111 as base components. ADEKA RESIN EP-4005 is an epoxide of an adduct formed by adding five equivalents in average of propylene oxide to bisphenol A, or a compound having the structure represented by general formula (1) in which the averages of a and b are each 5. Also, 70 g of KAYAHARD A-A (diaminodiethyldiphenylmethane, Nippon Kayaku Corporation), which serves as an aromatic amine curing agent (C) that is liquid at 25° C., was added to a curing-agent storage tank 112. A fiber reinforced plastic was then obtained in the manner described in the present embodiment. A curing accelerator 13 including an energy applying unit (iron 131) for applying thermal energy was used. The curing time taken by the resin composition in the fiber reinforced plastic to cure completely, and the condition of the fiber surface were measured or evaluated using the methods described below. Table 1 shows the evaluation results.

Curing Time

The curing time taken by the resin composition in the fiber reinforced plastic to be tack-free when touched was measured.

Condition of Fiber Surface

The fiber reinforced plastic obtained as above underwent a bend test with the method defined in JIS K 7017. The cross section of the fiber reinforced plastic was observed using a scanning electron microscope (JCM-5700, JEOL Ltd.) as ruptured through the bend test, and was rated in the following manner.

A: The resin adhered to the entire fiber surface.
B: The resin adhered to part of the fiber surface.
C: Almost no resin adhered to the fiber surface.

The cured resin with either rated A or B had a cohesive failure during rupture in the bend test, indicating that the cured resin had firmly adhered to the fibers. The cured resin rated C underwent interfacial peeling from the fibers during rupture in the bend test, indicating that the cured resin had not firmly adhered to the fibers. The resin products rated A and B were determined acceptable.

Example 2

As shown in Table 1, the same procedure as in Example 1 was followed to obtain a fiber reinforced plastic, except that 0.27 g of NUBIAN BLACK TN-870 (nigrosine black dye, ORIENT CHEMICAL INDUSTRIES CO., LTD.), which serves as a photoabsorptive component (D), was further added to the curing-agent storage tank 112, and that a curing accelerator 13 including an infrared heater (halogen heater) for emitting an activation energy ray (infrared ray) was used instead of the curing accelerator 13 including the energy applying unit for applying thermal energy (iron 131). Table 1 shows the curing time taken by the obtained fiber reinforced plastic to cure completely and the evaluation results of the fiber surface condition.

Comparative Example 1

As shown in Table 1, the same procedure as in Example 1 was followed to obtain a fiber reinforced plastic, except that KAYAHARD A-A was not added. Table 1 shows the curing time taken by the obtained fiber reinforced plastic to cure completely as well as the evaluation results of the fiber surface condition.

Comparative Example 2

As shown in Table 1, the same procedure as in Example 1 was followed to obtain a reinforced fiber plastic, except that LECy was not added and that the amounts of ADEKA RESIN EP-4901E and ADEKA RESIN EP-4005 were changed. Table 1 shows the curing time taken by the obtained fiber reinforced plastic to cure completely, as well as the evaluation results of the fiber surface condition.

TABLE 1

|  | Example 1 | Example 2 | Comparative Example 1 | Comparative Example 2 |
|---|---|---|---|---|
| EP-4901E | 50 | 50 | 50 | 100 |
| EP-4005 | 50 | 50 | 50 | 100 |
| LECy | 100 | 100 | 100 | — |
| KAYAHARD A-A | 70 | 70 | — | 70 |
| NUBIAN BLACK TN-870 | — | 0.27 | — | — |
| Energy applying unit | Iron | Halogen heater | Iron | Iron |
| Curing time (hr) | 3 | — | uncured | 24 |
| Irradiation time of infrared rays (sec) | — | 0.25 | — | — |
| Fiber surface condition | B | B | — | C |

The results in Table 1 reveal that the fiber reinforced plastics obtained in Examples 1 and 2 had the resin adhering to at least parts of their fiber surfaces. The results also reveal that the resin composition in Example 2 was cured much faster than the resin composition in Example 1, which was cured using the iron (thermal energy).

In Comparative Example 1, the resin composition was not cured, and thus no evaluation was followed.

The fiber reinforced plastic in Comparative Example 2, which uses the resin composition without LECy, took a longer time to cure the resin composition. Moreover, interfacial peeling of the cured resin from the fiber surface was observed.

INDUSTRIAL APPLICABILITY

The molding apparatus according to one or more embodiments of the present invention is used for molding using a fiber reinforced resin material for various structures, such as large wind turbine blades, airplane wings and bodies, structural parts for other transportation vehicles (automobiles, vessels, and trains), civil engineering and constructions, and sport gears, and thus is industrially highly useful.

REFERENCE SIGNS LIST 1 molding apparatus
3 mold
4 mold support device
5 fibers
7 fiber feeder
9 resin composition
11 resin composition feeder (resin feeder)
13 curing accelerator
15 transporter
17 pressing device
32 lamination apparatus
32a first end
32b second end

The invention claimed is:

1. A molding apparatus for molding a fiber reinforced resin material, the apparatus comprising:
a fiber feeder comprising a fiber-feeding roller;
a curing accelerator;
a roller;
a transporter configured to relatively move the fiber feeder, a resin composition feeder, an impregnator, and the curing accelerator in a first direction, wherein
the resin composition feeder comprises a movable nozzle configured to hold a resin composition,
the impregnator comprises a plurality of pressing rollers and is configured to mix fibers from the fiber feeder with the resin composition, and
the curing accelerator is located between two of the plurality of pressing rollers, the curing accelerator comprises an irradiating unit configured to irradiate at least one photoabsorptive component in the resin composition with activation energy rays; and
a frame configured to support the fiber feeder, the curing accelerator, and the roller separately from each other, whereby
the roller being configured to apply pressure to a lamination area via an actuator and move fibers drawn from rovings to the lamination area while pressing the fibers against the lamination area.

2. The molding apparatus for molding a fiber reinforced resin material according to claim 1, wherein
the resin composition comprises an epoxy resin (A) that contains 20 to 100% by mass of an epoxy compound represented by general formula (1) below:

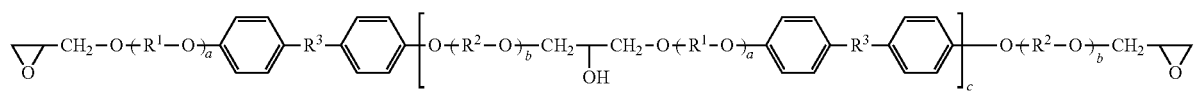

(1)

where a and b are each independently an integer of 2 to 10, c is an integer of 0 to 3, $R^1$ and $R^2$ are each independently a divalent hydrocarbon group having 2 to 5 carbon atoms, and $R^3$ is a single bond, a methylene group, or —C(CH$_3$)$_2$—.

3. The molding apparatus for molding a fiber reinforced resin material according to claim 2,
wherein acceleration of curing of the resin composition is performed while continuously moving the lamination area.

4. The molding apparatus for molding a fiber reinforced resin material according to claim 1, wherein
the photoabsorptive component is present in the resin composition in amount between 0.001% to 1.000% by mass.

5. The molding apparatus for molding a fiber reinforced resin material according to claim 1,
wherein the lamination area is on a table, the transporter relatively moves the table in the first direction, and the impregnator and the curing accelerator respectively perform impregnation and curing acceleration on the fibers and the resin composition that are fed to the table.

6. The molding apparatus of claim 5, wherein at least one end of each of the fibers is held in place on the table by a fixture.

7. The molding apparatus for molding a fiber reinforced resin material according to claim 1,
wherein the lamination area is a top surface side of a mold or a top surface side of a molded item.

8. The molding apparatus for molding a fiber reinforced resin material according to claim 1,
wherein the fiber feeder and the resin composition feeder respectively feed the fibers and the resin composition to one end of the lamination area, and the curing accelerator accelerates the curing of the resin composition fed to the one end until the fibers are unremovable from the resin composition.

9. The molding apparatus for molding a fiber reinforced resin material according to claim 1, wherein a wavelength of the activation energy rays is about 7 to about 100 μm.

10. The molding apparatus for molding a fiber reinforced resin material according to claim 1, wherein the frame further supports at least one cut fiber.

11. The molding apparatus for molding a fiber reinforced resin material according to claim 1, wherein
the lamination area is provided on a movable table.

12. The molding apparatus of claim 11, wherein at least one end of each of the fibers is held in place on the movable table by a fixture.

13. The molding apparatus for molding a fiber reinforced resin material according to claim 1, wherein
an actuator assists the impregnator in applying pressure to the lamination area.

14. The molding apparatus of claim 1, wherein at least one end of each of the fibers is held in place on the table by a fixture.

15. The molding apparatus of claim 1,
wherein acceleration of curing of the resin composition is performed while continuously moving the lamination area.

16. The molding apparatus of claim 15, wherein a wavelength of the activation energy rays is about 7 to about 100 μm.

17. The molding apparatus of claim 16, wherein
the resin composition comprises an epoxy resin (A) that contains 20 to 100% by mass of an epoxy compound represented by general formula (1) below:

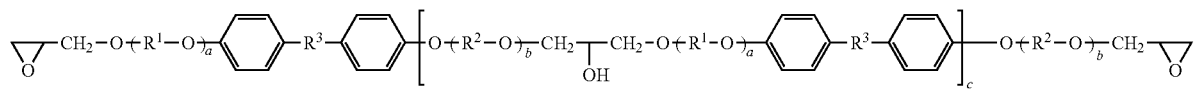

(1)

where a and b are each independently an integer of 2 to 10, c is an integer of 0 to 3, $R^1$ and $R^2$ are each independently a divalent hydrocarbon group having 2 to 5 carbon atoms, and $R^3$ is a single bond, a methylene group, or —$C(CH_3)_2$—.

* * * * *